United States Patent
Huang et al.

(10) Patent No.: US 12,413,285 B2
(45) Date of Patent: Sep. 9, 2025

(54) HOLOGRAPHIC-MIMO FIELD TYPE INDICATION

(71) Applicant: QUALCOMM Incorporated, San Diego, CA (US)

(72) Inventors: Min Huang, Beijing (CN); Wei Xi, Beijing (CN); Chao Wei, Beijing (CN); Hao Xu, Beijing (CN); Danlu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 18/556,318

(22) PCT Filed: Jun. 24, 2021

(86) PCT No.: PCT/CN2021/101954
§ 371 (c)(1),
(2) Date: Oct. 19, 2023

(87) PCT Pub. No.: WO2022/266913
PCT Pub. Date: Dec. 29, 2022

(65) Prior Publication Data
US 2024/0195480 A1    Jun. 13, 2024

(51) Int. Cl.
*H04B 7/06* (2006.01)
*H04B 7/08* (2006.01)

(52) U.S. Cl.
CPC ........... *H04B 7/0695* (2013.01); *H04B 7/063* (2013.01); *H04B 7/088* (2013.01)

(58) Field of Classification Search
CPC ...... H04B 7/0695; H04B 7/063; H04B 7/088; H04B 7/0617; H04B 7/0413; H04B 7/06952; H04B 7/0456; H04W 16/28
See application file for complete search history.

(56) References Cited

U.S. PATENT DOCUMENTS

2010/0165914 A1* 7/2010 Cho .................... H04B 7/0697
                                                                     370/328
2016/0344519 A1* 11/2016 Lin ......................... H04L 5/005
(Continued)

FOREIGN PATENT DOCUMENTS

CN    110176672 A    8/2019
CN    111954229 A    11/2020
(Continued)

OTHER PUBLICATIONS

Supplementary European Search Report—EP21946410—Search Authority—Munich—Feb. 3, 2025.
(Continued)

*Primary Examiner* — Sophia Vlahos
(74) *Attorney, Agent, or Firm* — William P. Gvoth; Holland & Hart LLP

(57) ABSTRACT

Methods, systems, and devices for wireless communications are described. A wireless device (e.g., a base station) may transmit, to a user equipment (UE), an indication of a field type of a field between the UE and the wireless device. The indication of the field type may include one or more bits indicating the field type, a measure indicating a likelihood that the field type includes a first field type as compared to a second field type, an indication that the first type is the same as a second field type configured at the UE, or any combination thereof. The UE may select between a first set of beam weight vectors and a second set of beam weight vectors based on the field type. The UE may communicate, with the base station, a reference signal using a beam generated using a first beam weight vector from the selected set.

30 Claims, 24 Drawing Sheets

(56) References Cited

U.S. PATENT DOCUMENTS

| | | | |
|---|---|---|---|
| 2017/0026094 A1* | 1/2017 | Milleth | H04B 7/086 |
| 2017/0033916 A1* | 2/2017 | Stirling-Gallacher | H04W 72/0446 |
| 2018/0115958 A1* | 4/2018 | Raghavan | H04B 7/0695 |
| 2019/0029073 A1* | 1/2019 | Yiu | H04W 88/10 |
| 2019/0158162 A1 | 5/2019 | Ryu et al. | |

FOREIGN PATENT DOCUMENTS

| | | | |
|---|---|---|---|
| CN | 112087776 A | 12/2020 | |
| WO | WO-2018075151 A1 | 4/2018 | |
| WO | WO-2022130289 A1 * | 6/2022 | H04B 17/318 |

OTHER PUBLICATIONS

Zhang H., et al., "Beam Focusing for Near-Field Multi-User MIMO Communications", arXiv:2105.13087v1 [eess.SP], Arxiv.Org, Cornell University Library, 201 Olin Library Cornell University Ithaca, NY 14853, May 27, 2021, pp. 1-30, XP081970145, abstract, introduction, p. 2, p. 6-p. 7, figure 2.

International Search Report and Written Opinion—PCT/CN2021/101954—ISA/EPO—Mar. 22, 2022.

* cited by examiner

HOLOGRAPHIC-MIMO FIELD TYPE INDICATION

CROSS REFERENCE

The present Application is a 371 national stage filing of International PCT Application No. PCT/CN2021/101954 by HUANG et al. entitled "HOLOGRAPHIC-MIMO FIELD TYPE INDICATION," filed Jun. 24, 2021, which is assigned to the assignee hereof, and which is expressly incorporated by reference in its entirety herein.

FIELD OF TECHNOLOGY

The following relates to wireless communications, including holographic multiple input multiple output (MIMO) field type indication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a user equipment (UE) may perform a beam sweeping procedure when communicating with a base station. For instance, the UE may sweep through a set of beams in order to determine a beam to use to communicate with the base station. Techniques which decrease the latency associated with performing the beam sweeping procedure may increase the efficiency of communications.

SUMMARY

The described techniques relate to improved methods, systems, devices, and apparatuses that support holographic-MIMO field type indication. Generally, the described techniques provide for a user equipment (UE) to perform beam sweeping over a fewer number of beams, which may decrease a latency associated with performing beam sweeping. For instance, a wireless device (e.g., a base station) may transmit, to a UE, an indication of a field type of a field between the UE and the wireless device. The indication of the field type may include one or more bits indicating the field type, a measure indicating a likelihood that the field type includes a first field type as compared to a second field type, an indication that the first type is the same as a second field type configured at the UE, or any combination thereof. The UE may select between a first set of beam weight vectors and a second set of beam weight vectors based on the field type. The UE may communicate, with the base station, a reference signal using a beam generated using a first beam weight vector from the selected set.

A method for wireless communication at a user equipment (UE) is described. The method may include receiving, from a wireless device, an indication of a field type of a field between the UE and the wireless device, selecting between a first set of beam weight vectors and a second set of beam weight vectors based on the field type, and communicating a reference signal with the wireless device using a beam generated using a first beam weight vector from the selected set of beam weight vectors.

An apparatus for wireless communication at a UE is described. The apparatus may include a processor, memory coupled with the processor, and instructions stored in the memory. The instructions may be executable by the processor to cause the apparatus to receive, from a wireless device, an indication of a field type of a field between the UE and the wireless device, select between a first set of beam weight vectors and a second set of beam weight vectors based on the field type, and communicate a reference signal with the wireless device using a beam generated using a first beam weight vector from the selected set of beam weight vectors.

Another apparatus for wireless communication at a UE is described. The apparatus may include means for receiving, from a wireless device, an indication of a field type of a field between the UE and the wireless device, means for selecting between a first set of beam weight vectors and a second set of beam weight vectors based on the field type, and means for communicating a reference signal with the wireless device using a beam generated using a first beam weight vector from the selected set of beam weight vectors.

A non-transitory computer-readable medium storing code for wireless communication at a UE is described. The code may include instructions executable by a processor to receive, from a wireless device, an indication of a field type of a field between the UE and the wireless device, select between a first set of beam weight vectors and a second set of beam weight vectors based on the field type, and communicate a reference signal with the wireless device using a beam generated using a first beam weight vector from the selected set of beam weight vectors.

In some examples of the method, apparatuses, and non-transitory computer-readable medium described herein, communicating the reference signal may include operations, features, means, or instructions for performing a beam sweep procedure using a set of multiple beams corresponding to the selected set of beam weight vectors, where each beam of the set of multiple beams may be generated using a respective beam weight vector of the selected set of beam weight vectors.

In some examples of the method, apparatuses, and non-transitory computer-readable medium described herein, receiving the indication of the field type may include operations, features, means, or instructions for receiving one or more bits indicating the field type, where each value of the one or more bits corresponds to a respective field type of a set of field types, and where selecting between the first set of beam weight vectors and the second set of beam weight vectors may be based on the one or more bits.

In some examples of the method, apparatuses, and non-transitory computer-readable medium described herein, receiving the indication of the field type may include operations, features, means, or instructions for receiving a measure indicating a likelihood that the field type includes a first field type as compared to a second field type, where selecting between the first set of beam weight vectors and the second set of beam weight vectors may be based on receiving the measure indicating the likelihood.

In some examples of the method, apparatuses, and non-transitory computer-readable medium described herein, receiving the indication of the field type may include operations, features, means, or instructions for receiving an indication that the field type may be the same as a second field type configured at the UE for a reference signal resource, where selecting between the first set of beam weight vectors and the second set of beam weight vectors may be based on receiving the indication that the field type may be the same as the second field type.

In some examples of the method, apparatuses, and non-transitory computer-readable medium described herein, the first set of beam weight vectors is associated with a first codebook for two-dimensional beams and the second set of beam weight vectors is associated with a second codebook for three-dimensional beams. In some examples of the method, apparatuses, and non-transitory computer-readable medium described herein, receiving the indication of the field type may include operations, features, means, or instructions for receiving the indication of the field type that indicates to select one of the first codebook or the second codebook, where selecting between the first set of beam weight vectors and the second set of beam weight vectors includes selecting between the first codebook or the second codebook based on the indication of the field type, and where communicating the reference signal includes performing a beam sweep procedure using one or more beams generated using the selected codebook.

In some examples of the method, apparatuses, and non-transitory computer-readable medium described herein, communicating the reference signal may include operations, features, means, or instructions for receiving, from the wireless device, the reference signal that may be a synchronization signal, a channel state information reference signal, or both, using the beam.

In some examples of the method, apparatuses, and non-transitory computer-readable medium described herein, communicating the reference signal may include operations, features, means, or instructions for transmitting, to the wireless device, the reference signal that may be a sounding reference signal using the beam.

In some examples of the method, apparatuses, and non-transitory computer-readable medium described herein, receiving the indication of the field type may include operations, features, means, or instructions for receiving the indication of the field type via radio resource control signaling, medium access control (MAC) control element (MAC-CE) signaling, downlink control information signaling, uplink control information signaling, sidelink control information signaling, or any combination thereof.

In some examples of the method, apparatuses, and non-transitory computer-readable medium described herein, the wireless device includes a first transmission reception point and the method, apparatuses, and non-transitory computer-readable medium may include further operations, features, means, or instructions for receiving, during a time when the UE may be configured to communicate with the first transmission reception point, an indication of a field type between the UE and a second transmission reception point.

In some examples of the method, apparatuses, and non-transitory computer-readable medium described herein, the indication of the field type may be for one of a control channel or a data channel and the method, apparatuses, and non-transitory computer-readable medium may include further operations, features, means, or instructions for receiving, from the wireless device, an indication of a second field type for the other of the control channel or the data channel.

In some examples of the method, apparatuses, and non-transitory computer-readable medium described herein, the indication of the field type may be for the beam of a channel and the method, apparatuses, and non-transitory computer-readable medium may include further operations, features, means, or instructions for receiving, from the wireless device, an indication of a second field type for a second beam of the channel.

In some examples of the method, apparatuses, and non-transitory computer-readable medium described herein, the field type includes an indication that the UE may be in a near-field relative to the wireless device or that the UE may be in a far-field relative to the wireless device.

A method for wireless communication at a base station is described. The method may include transmitting, to a UE, an indication of a field type of a field between the UE and the base station, the indication of the field type indicating to use one of a first set of beam weight vectors or a second set of beam weight vectors and communicating a reference signal with the UE based on transmitting the indication of the field type that indicates one of the first set of beam weight vectors or the second set of beam weight vectors.

An apparatus for wireless communication at a base station is described. The apparatus may include a processor, memory coupled with the processor, and instructions stored in the memory. The instructions may be executable by the processor to cause the apparatus to transmit, to a UE, an indication of a field type of a field between the UE and the base station, the indication of the field type indicating to use one of a first set of beam weight vectors or a second set of beam weight vectors and communicate a reference signal with the UE based on transmitting the indication of the field type that indicates one of the first set of beam weight vectors or the second set of beam weight vectors.

Another apparatus for wireless communication at a base station is described. The apparatus may include means for transmitting, to a UE, an indication of a field type of a field between the UE and the base station, the indication of the field type indicating to use one of a first set of beam weight vectors or a second set of beam weight vectors and means for communicating a reference signal with the UE based on transmitting the indication of the field type that indicates one of the first set of beam weight vectors or the second set of beam weight vectors.

A non-transitory computer-readable medium storing code for wireless communication at a base station is described. The code may include instructions executable by a processor to transmit, to a UE, an indication of a field type of a field between the UE and the base station, the indication of the field type indicating to use one of a first set of beam weight vectors or a second set of beam weight vectors and communicate a reference signal with the UE based on transmitting the indication of the field type that indicates one of the first set of beam weight vectors or the second set of beam weight vectors.

In some examples of the method, apparatuses, and non-transitory computer-readable medium described herein, transmitting the indication of the field type may include operations, features, means, or instructions for transmitting one or more bits indicating the field type, where each value of the one or more bits corresponds to a respective field type of a set of field types, and where communicating the reference signal may be based on the one or more bits.

In some examples of the method, apparatuses, and non-transitory computer-readable medium described herein, transmitting the indication of the field type may include operations, features, means, or instructions for transmitting a measure indicating a likelihood that the field type includes a first field type as compared to a second field type, where communicating the reference signal may be based on transmitting the measure indicating the likelihood.

In some examples of the method, apparatuses, and non-transitory computer-readable medium described herein, transmitting the indication of the field type may include operations, features, means, or instructions for transmitting an indication that the field type may be the same as a second field type configured at the UE for a reference signal resource, where communicating the reference signal may be based on transmitting the indication that the field type may be the same as the second field type.

In some examples of the method, apparatuses, and non-transitory computer-readable medium described herein, communicating the reference signal may include operations, features, means, or instructions for transmitting, to the UE, the reference signal that may be a synchronization signal, a channel state information reference signal, or both.

In some examples of the method, apparatuses, and non-transitory computer-readable medium described herein, communicating the reference signal may include operations, features, means, or instructions for receiving, from the UE, the reference signal that may be a sounding reference signal.

In some examples of the method, apparatuses, and non-transitory computer-readable medium described herein, transmitting the indication of the field type may include operations, features, means, or instructions for transmitting the indication of the field type via radio resource control signaling, medium access control (MAC) control element (MAC-CE) signaling, downlink control information signaling, uplink control information signaling, sidelink control information signaling, or any combination thereof.

In some examples of the method, apparatuses, and non-transitory computer-readable medium described herein, the first set of beam weight vectors is associated with a first codebook for two-dimensional beams and the second set of beam weight vectors is associated with a second codebook for three-dimensional beams. In some examples of the method, apparatuses, and non-transitory computer-readable medium described herein, transmitting the indication of the field type may include operations, features, means, or instructions for transmitting the indication of the field type that indicates to select one of the first codebook or the second codebook, where communicating the reference signal may be based on transmitting the indication of the field type that indicates to select the one of the first codebook or the second codebook.

In some examples of the method, apparatuses, and non-transitory computer-readable medium described herein, the indication of the field type may be for one of a control channel or a data channel and the method, apparatuses, and non-transitory computer-readable medium may include further operations, features, means, or instructions for transmitting, to the UE, an indication of a second field type for the other of the control channel or the data channel.

In some examples of the method, apparatuses, and non-transitory computer-readable medium described herein, the indication of the field type may be for a beam of a channel and the method, apparatuses, and non-transitory computer-readable medium may include further operations, features, means, or instructions for transmitting, to the UE, an indication of a second field type for a second beam of the channel.

In some examples of the method, apparatuses, and non-transitory computer-readable medium described herein, the field type includes an indication that the UE may be in a near-field relative to the base station or that the UE may be in a far-field relative to the base station.

DETAILED DESCRIPTION

Figure 1:
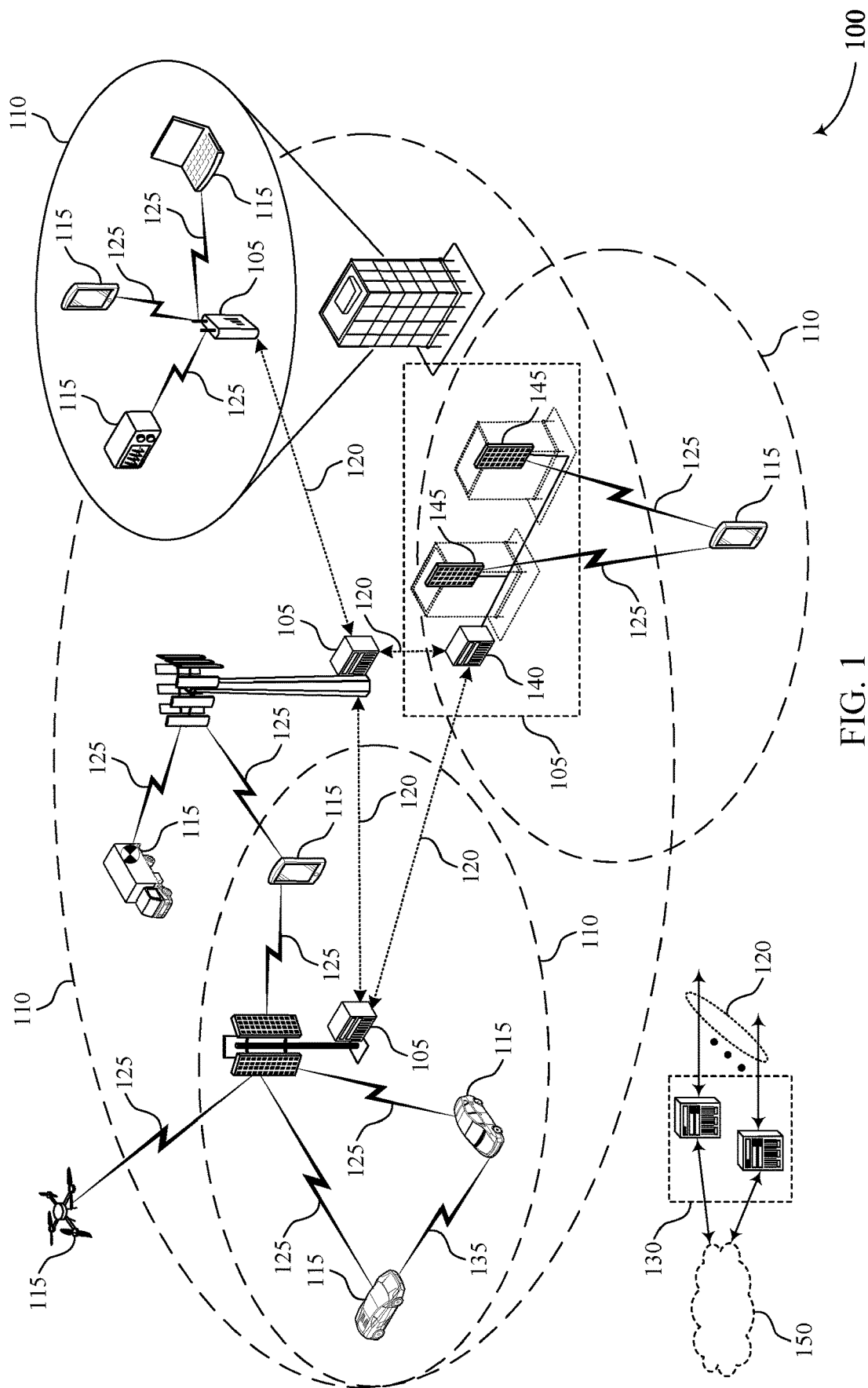
FIG. 1 illustrates an example of a wireless communications system that supports holographic multiple input multiple output (MIMO) field type indication in accordance with aspects of the present disclosure.

A user equipment (UE) may communicate with a wireless device, such as a base station, a transmission reception point (TRP), or another UE. In some examples, the distance between the UE and the wireless device may vary. If the UE is within a threshold distance of the wireless device, the UE may be within a near-field of the wireless device. However, if the UE is outside the threshold distance from the wireless device, the UE may be within a far-field of the wireless device. A UE within the near-field of the wireless device may communicate using a first set of beams (e.g., two-dimensional (2D) beams) and a UE within the far-field of the wireless device may communicate using a second set of beams (e.g., three-dimensional (3D) beams via holographic multiple input multiple output (MIMO)). However, there may be examples in which the UE has not determined whether the UE is within the near-field or the far-field (e.g., due to the UE failing to identify the threshold distance and/or the distance between the UE and the wireless device). Accordingly, the UE may sweep through the first set of beams and the second set of beams, which may be associated with a higher latency than sweeping through one of the first set of beams and the second set of beams.

The methods described herein may enable a UE to determine whether the UE is in the near-field or the far-field and/or to sweep one of the first set of beams and the second set of beams (e.g., instead of sweeping both). For instance, a wireless device, such as a base station or another UE, may transmit, to the UE, an indication of a field type (e.g., far-field, near-field) of a field between the UE and the wireless device. The wireless device may indicate the field type via an explicit hard value (e.g., one or more bits, where each value of the one or more bits corresponds to a different field type), an explicit soft value (e.g., a measure indicating a likelihood that the UE is in the near-field as compared to the UE being in the far-field), or via implicit signaling (e.g., an indication that the field type is the same as a second field type for signaling resources already configured at the UE). Upon determining the field type, the UE may select one of the first set of beams and the second set of beams. For instance, the UE may select the first set of beams if the field type indicates that the UE is in the far-field and may select the second set of beams if the field type indicates that the UE is in the near-field. The UE may perform beam sweeping using the selected set of beams and may communicate a reference signal with the wireless device using a beam of the selected set of beams.

Aspects of the disclosure are initially described in the context of wireless communications systems. Additional aspects of the disclosure are described in the context of surface configuration schemes, beam communications schemes, beam configuration schemes, a field partitioning, process flows, Aspects of the disclosure are further illustrated by and described with reference to apparatus diagrams, diagrams, and flowcharts that relate to holographic-MIMO field type indication.

FIG. 1 illustrates an example of a wireless communications system 100 that supports holographic-MIMO field type indication in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier.

One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IOT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may communicate with a wireless device, such as a base station 105, a TRP, or another UE 115. In some examples, the distance between the UE 115 and the wireless device may vary. If the UE 115 is within a threshold distance of the wireless device, the UE may be within a near-field of the wireless device. However, if the UE 115 is outside the threshold distance from the wireless device, the UE 115 may be within a far-field of the wireless device. A UE 115 within the near-field of the wireless device may communicate using a first set of beams (e.g., two-dimensional (2D) beams) and a UE 115 within the far-field of the wireless device may communicate using a second set of beams (e.g., three-dimensional (3D) beams). However, there may be examples in which the UE 115 has not determined whether the UE is within the near-field or the far-field (e.g., due to the UE 115 failing to identify the threshold distance and/or the distance between the UE and the wireless device). Accordingly, the UE 115 may sweep through the first set of beams and the second set of beams, which may be associated with a higher latency than sweeping through one of the first set of beams and the second set of beams.

The methods described herein may enable a UE 115 to determine whether the UE 115 is in the near-field or the far-field and/or to sweep one of the first set of beams and the second set of beams (e.g., instead of sweeping both). For instance, the wireless device may transmit, to the UE 115, an indication of a field type (e.g., far-field, near-field) of a field between the UE 115 and the wireless device. The wireless device may indicate the field type via an explicit hard value (e.g., one or more bits, where each value of the one or more bits corresponds to a different field type), an explicit soft value (e.g., a measure indicating a likelihood that the UE is in the near-field as compared to the UE 115 being in the far-field), or via implicit signaling (e.g., an indication that the field type is the same as a second field type for signaling resources already configured at the UE 115). Upon determining the field type, the UE 115 may select one of the first set of beams and the second set of beams. For instance, the UE 115 may select the first set of beams if the field type indicates that the UE 115 is in the far-field and may select the second set of beams if the field type indicates that the UE 115 is in the near-field. The UE 115 may perform beam sweeping using the selected set of beams and may communicate a reference signal with the wireless device using a beam of the selected set of beams.

Figure 2:
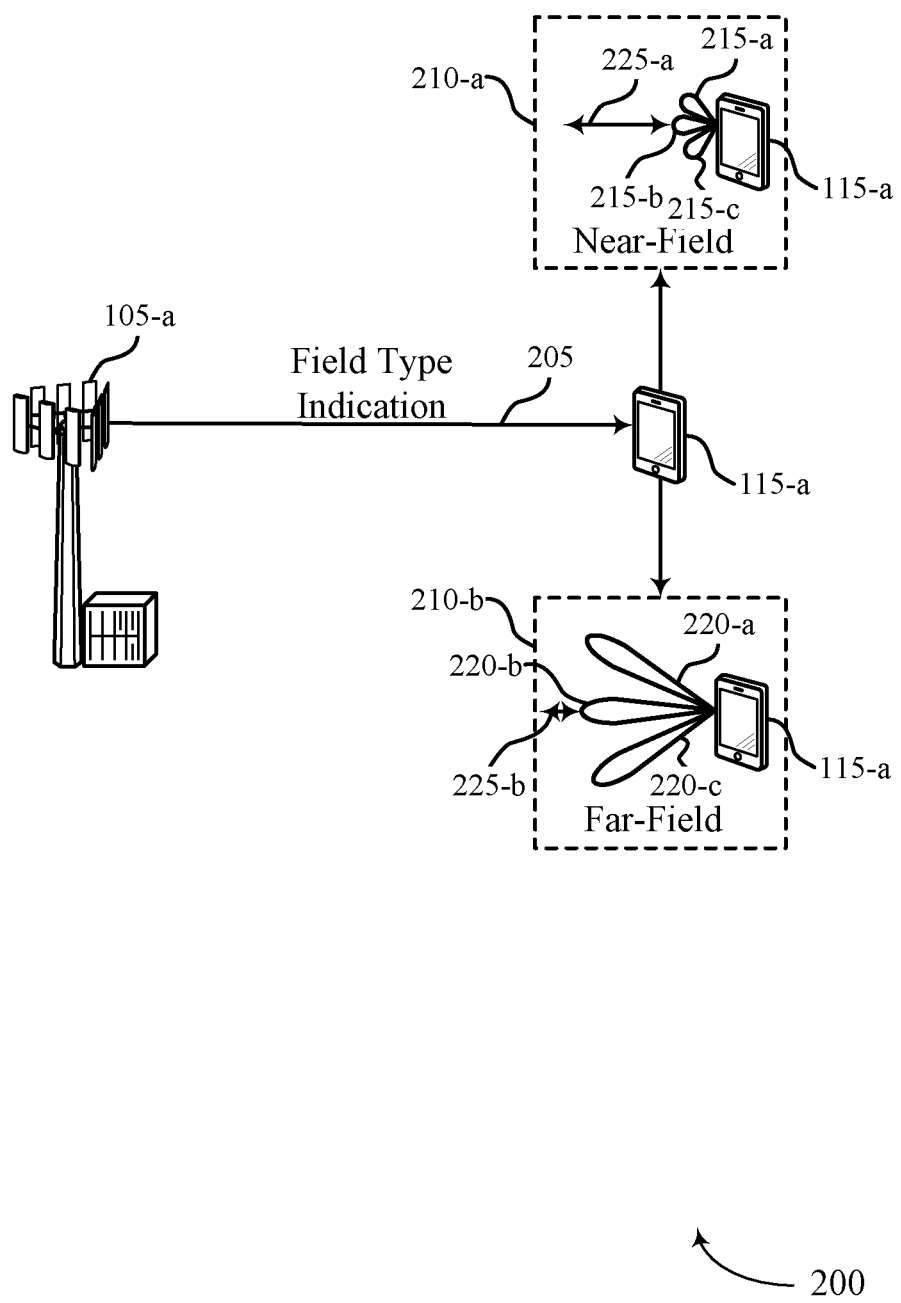
FIG. 2 illustrates an example of a wireless communications system that supports holographic-MIMO field type indication in accordance with aspects of the present disclosure.

FIG. 2 illustrates an example of a wireless communications scheme 200 that supports holographic-MIMO field type indication in accordance with aspects of the present disclosure. In some examples, wireless communications scheme 200 may implement one or more aspects of wireless communications system 100. For instance, base station 105-*a* may be an example of a base station 105 as described with reference to FIG. 1 and UE 115-*a* may be an example of a UE 115 as described with reference to FIG. 1. Although a base station 105-*a* is described herein, it should be noted that the methods described herein may be applied if base station 105-*a* includes or is substituted with a TRP or if base station 105-*a* is substituted with a UE 115. Additionally or alternatively, the methods described herein may be applied if UE 115-*a* is substituted with a base station 105.

UE 115-*a* may be within a near-field or a far-field of base station 105-*a*. However, there may be examples in which UE 115-*a* has not determined whether UE 115-*a* is within the near-field or the far-field. Accordingly UE 115-*a* may sweep through a first set of beams (e.g., beams 220-*a*, 220-*b*, and 220-*c*) associated with the far-field, where each beam of the first set of beams is associated with a respective beam weight vector of a first set of beam weight vectors, and a second set of beams (e.g., beams 215-*a*, 215-*b*, and 215-*c*) associated with the near-field, where each beam of the second set of beams is associated with a respective beam weight vector of a second set of beam weight vectors. However, sweeping through both the first set of beams and the second set of beams may be associated with a higher latency as compared to sweeping through one of the first set of beams and the second set of beams.

In order to enable UE 115-*a* to determine whether UE 115-*a* is within the near-field or the far-field, base station 105-*a* may transmit, to UE 115-*a*, an indication of a field type of a field between UE 115-*a* and base station 105-*a*. If the indicated field type is the near-field, UE 115-*a* may perform a beam sweep according to beam configuration 210-*a*, in which UE 115-*a* may perform a beam sweep over beams 215-*a*, 215-*b*, and 215-*c*, which may be examples of 3D beams. However, if the indicated field type is far-field, UE 115-*a* may perform the beam sweep according to beam configuration 210-*b*, in which UE 115-*a* may perform a beam sweep over beams 220-*a*, 220-*b*, and 220-*c*, which may be examples of 2D beams.

Performing the beam sweep according to beam configuration 210-*b* may include UE 115-*a* selecting the first set of beam weight vectors associated with the first set of beams (e.g., beams 220-*a*, 220-*b*, and 220-*c*) based on the field type indicating the far-field. Similarly, performing the beam sweep according to beam configuration 210-*a* may include UE 115-*a* selecting the second set of beam weight vectors associated with the second set of beams (e.g., beams 215-*a*, 215-*b*, and 215-*c*) based on the field type indicating the near-field.

After performing the beam sweep, UE 115-*a* may communicate a reference signal with base station 105-*a*. For instance, UE 115-*a* may communicate reference signal 225-*a* over one of beams 215-*a*, 215-*b*, and 215-*c* or may communicate reference signal 225-*b* over one of beams 220-*a*, 220-*b*, and 220-*c*. In some examples, UE 115-*a* may communicate reference signal 225-*a* or 225-*b* based on generating the respective beam (e.g., one of beams 215-*a*, 215-*b*, 215-*c*, 220-*a*, 220-*b*, and 220-*c*) using a beam weight vector from the first set of beam weight vectors (e.g., the first set of beams including beams 220-*a*, 220-*b*, and 220-*c*) or the second set of beam weight vectors (e.g., the second set of beams including beams 215-*a*, 215-*b*, and 215-*c*). In some examples, In examples in which reference signal 225-*a* or 225-*b* is a synchronization signal, such as a synchronization signal block (SSB), or a channel state information reference signal (CSI-RS), UE 115-*a* may receive the reference signal 225-*a* or 225-*b* from base station 105-*a* using the beam selected from the beam sweep. Alternatively, in examples in which reference signal 225-*a* or 225-*b* is a sounding reference signal (SRS), UE 115-*a* may transmit the reference signal 225-*a* or 225-*b* to base station 105-*a* using the beam selected from the beam sweep. In some examples, the field type indication 205 may indicate the field type value of a resource (e.g., an SRS resource, a CSI-RS resource, a synchronization signal resource) or a resource set (e.g., a CSI-RS resource set) and may be conveyed via control signaling.

In some examples, the field type indication 205 may include an explicit hard value indicating the field type. For instance, the field type indication 205 may include one or more bits indicating the field type, where each value of the one or more bits corresponds to a respective field type of a set of field types. In one example, a the one or more bits may include a single bit where a '0' indicates one of the near-field or the far-field and a '1' indicates the other of the near-field or the far-field.

Additionally or alternatively, the field type indication 205 may include an explicit soft value indicating the field type. For instance, the field type indication 205 may include a measure indicating a likelihood that the field type includes a first field type (e.g., the near-field) as compared to a second field type (e.g., the far-field). In one example, a larger value of the measure may indicate a higher likelihood of UE 115-*a* being in the far-field, whereas a smaller value of the measure may indicate a higher likelihood of UE 115-*a* being in the near-field. In some examples, the measure may be a real value or an integer number.

Additionally or alternatively, the field type indication 205 include an implicit indication of the field type. For instance, the field type indication 205 may include an indication that the field type is the same as a second field type configured at UE 115-*a* for a reference signal resource (e.g., a resource for communicating a reference signal, such as a synchronization signal, a CSI-RS, or an SRS). In some examples, the reference signal conveyed over the reference signal resource may be the same type of reference signal as the reference signal 225-*a* or 225-*b* that UE 115-*a* is to convey once the field type indication 205 is received.

In some examples, the first set of beam weight vectors may be associated with a first codebook for 2D beams (e.g., beams 220-*a*, 220-*b*, and 220-*c*) and the second set of beam weight vectors may be associated with a second codebook for 3D beams (e.g., beams 215-*a*, 215-*b*, and 215-*c*). In some such examples, the field type indication 205 may indicate to select one of the first codebook or the second codebook and selecting between the first set of beam weight vectors and the second set of beam weight vectors may include selecting between the first codebook and the second codebook. Additionally, communicating reference signal 225-*a* or 225-*b* may include performing a beam sweep procedure using one or more beams generated using the second codebook or the first codebook, respectively.

In some examples, the field type indication 205 may be conveyed via radio resource control (RRC) signaling, medium access control (MAC) control element (MAC-CE) signaling, downlink control information (DCI) signaling, uplink control information (UCI) signaling, sidelink control information (SCI) signaling, or any combination thereof. The field type indication 205 may be conveyed via UCI signaling in examples in which UE 115-*a* is substituted with a base station 105 and/or base station 105-*a* is substituted with a UE 115. The field type indication 205 may be conveyed via SCI signaling in examples in which base station 105-*a* is substituted with a UE 115.

In some examples, the resources associated with field type indication 205 may be associated with a TRP, a cell, or a bandwidth part (BWP). For instance, if a cell (e.g., a cell within UE 115-*a* is operating) or UE 115-*a* is configured with multiple TRPs, each TRP may have different field type values. Additionally or alternatively, each channel (e.g., data channel, control channel) may have a field type value specific to the channel. Additionally or alternatively, the field type may be specific to a particular beam for a same channel. For instance, a first beam may have a first field type, but a second beam may have a second field type. In one example, SSB may use 2D beams, but CSI-RS may use 2D or 3D beams.

In some examples, the methods described herein may be associated with one or more advantages. For instance, the field type indication 205 indicating the field type may enable UE 115-*a* to determine whether to sweep the first set of beams (e.g., beams 220-*a*, 220-*b*, and 220-*c*) associated with a first field type or the second set of beams (e.g., beams 215-*a*, 215-*b*, or 215-*c*) associated with a second field type. Accordingly, instead of sweeping both the first set of beams and the second set of beams, UE 115-*a* may sweep one of the first set of beams and the second set of beams, which may be associated with fewer beams than both of the first set of beams and the second set of beams. Sweeping fewer beams may be associated with lower latency, which may increase the efficiency of communications.

Figure 3A:
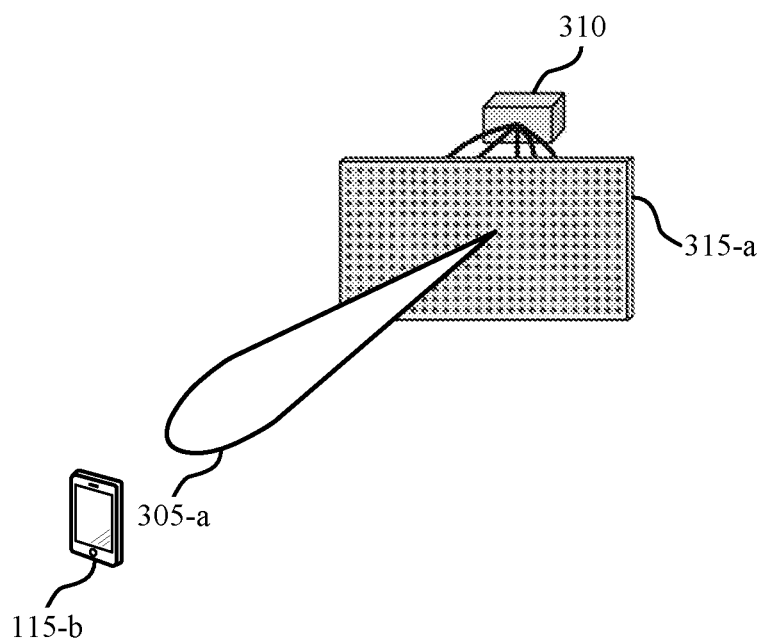
FIGS. 3A and 3B illustrate examples of surface configuration schemes that support holographic-MIMO field type indication in accordance with aspects of the present disclosure.
Figure 3B:
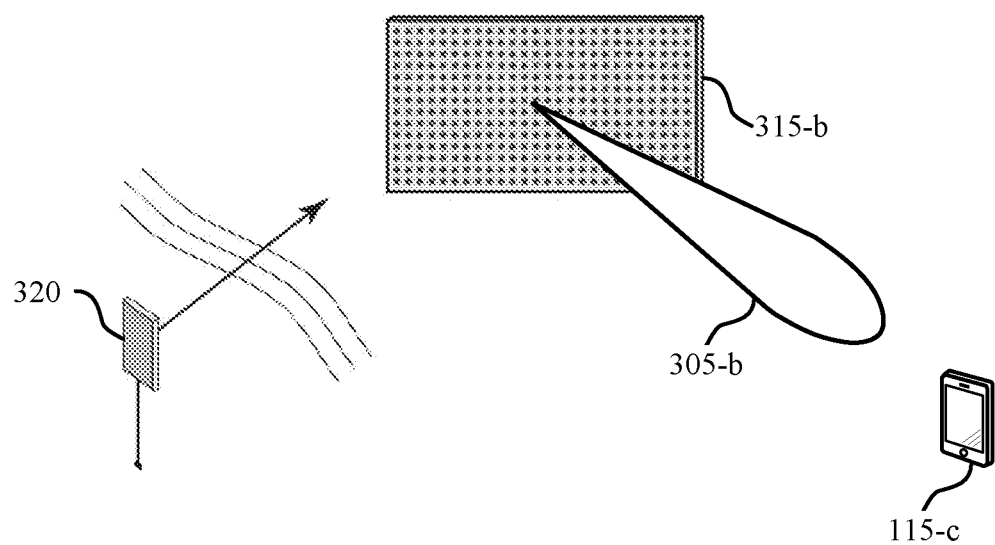

FIGS. 3A and 3B illustrate examples of surface configuration schemes 300-*a* and 300-*b* that support holographic-MIMO field type indication in accordance with aspects of the present disclosure. In some examples, surface configuration schemes 300-*a* and 300-*b* may be implemented by one or more aspects of wireless communications system 100. For instance, UEs 115-*b* and 115-*c* may be an example of UEs 115 as described with reference to FIG. 1.

Surface configuration scheme 300-*a* may illustrate an example in which a surface 315-*a* performs holographic MIMO in an active configuration and surface configuration scheme 300-*b* may illustrate an example in which a surface 315-*b* performs holographic MIMO in a passive configuration. For instance, in an activate configuration, a radio frequency (RF) signal may be generated by RF signal generator 310 at the backside of the surface 315-*a* and may be propagated through a steerable distribution network to radiating elements that generate beam 305-*a*. For the passive configuration, the RF signal may be sent from another location (e.g., by RF transmitter 320, which may be an example of a UE 115 or a base station 105 as described herein) and the surface 315-*b* (e.g., a metasurface) may reflect it using steerable elements that generate beam 305-*b*. In some examples, surface 315-*a* may include radiating elements and surface 315-*b* may include reflecting elements.

Figure 4A:
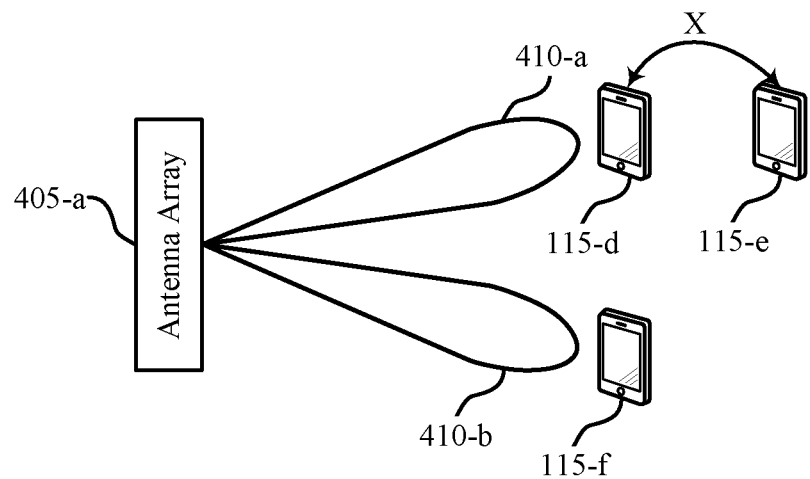
FIGS. 4A and 4B illustrate examples of beam communications schemes that support holographic-MIMO field type indication in accordance with aspects of the present disclosure.
Figure 4B:
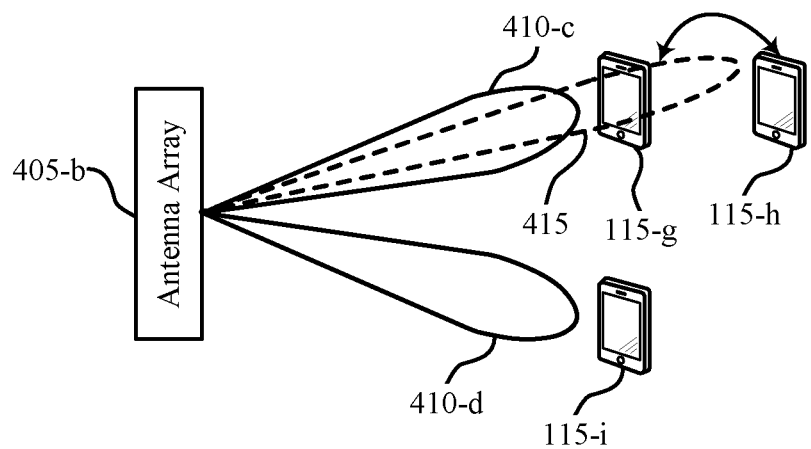

FIGS. 4A and 4B illustrate examples of beam communications schemes 400-*a* and 400-*b* that support holographic-MIMO field type indication in accordance with aspects of the present disclosure. In some examples, beam communications schemes 400-*a* and 400-*b* may be implemented by one or more aspects of wireless communications system 100. For instance, antenna arrays 405-*a* and 405-*b* may be an example of antenna array at a UE 115 or a base station 105 as described with reference to FIG. 1. Additionally or alternatively, UEs 115-d, 115-e, 115-f, 115-g, 115-h, and 115-i may be examples of UEs 115 as described with reference to FIG. 1. In some examples, antenna arrays 405-a and 405-b may be referred to as an antenna panel.

Antenna array 405-a may communicate with UE 115-d via beam 410-a and may communicate with UE 115-f via beam 410-b. In some examples, antenna array 405-a may generate beams 410-a and 410-b via 2D beamforming. 2D beamforming may be used to concentrate transmission power to a direction, described by angles in azimuth and zenith (e.g., azimuth of departure (AoD), azimuth of arrival (AoA), zenith of departure (ZoD), zenith of arrival (ZoA). However, 2D beamforming may be associated with a lower multiuser (MU) MIMO opportunity than other types of beamforming (e.g., 3D beamforming). For instance, an antenna array 405-a using 2D beamforming may not discriminate UEs 115 in the same direction and different distances (e.g., UEs 115-d and 115-e), and may thus not pair them for MU-MIMO transmission. Such lack of capability to discriminate may result in restricted MU pairing opportunities, restricted MU diversity gain, and reduced cell-level spectral efficiency as compared to other types of beamforming (e.g., 3D beamforming). Additionally, 2D beamforming may be associated with a lower transmission power utilization efficiency than other types of beamforming (e.g., 3D beamforming). For instance, a 2D beam may cover a whole area of a certain angle, but the target UE 115 may be located at one spot with a certain distance from antenna array 405-a. Thus, the transmission power landing at the areas with other distances may be wasted. For instance, the portions of the 2D beam that do not end up at the target UE 115 may not be used for communications and, accordingly, may waste power.

Antenna array 405-b may communicate with UE 115-g via beam 410-c, may communicate with UE 115-i via beam 410-d, and may communicate with UE 115-h via beam 415. In some examples, the coverage area close to (e.g., within a threshold distance of) antenna array 405-b may be referred to as a near field and the coverage area far away from (e.g., outside of the threshold distance of) antenna array 405-b may be referred to as the far field. when the distance of a coverage area is sufficiently short (e.g., relative to panel size), the generated beam of this area may have holographic characteristics. For instance, the beam may be capable of distinguishing direction and distance and, accordingly, may be referred to as a 3D or holographic beam. Additionally, the beam may cover a certain angular range and a certain distance range. When antenna array 405-b uses one or more 3D or holographic beams to transmit one or multiple data streams, antenna array 405-b may be referred to as a holographic MIMO system. 3D beamforming may be associated with a higher MU-MIMO opportunity than other types of beamforming (e.g., 2D beamforming). For instance, antenna arrays 405-b using 3D beamforming may discriminate UEs 115 with the same direction and different distances (e.g., UEs 115-g and 115-h) and may pair them for MU-MIMO transmission. Such discrimination may enhance MU pairing opportunity, enhance MU diversity gain, and improve cell-level spectral efficiency as compared to other types of beamforming (e.g., 2D beamforming). Additionally, 3D beamforming may be associated with a higher transmission power utilization efficiency than other types of beamforming (e.g., 2D beamforming). For instance, a 3D beam may cover the area of a target UE 115 in terms of both direction and distance. Accordingly, the transmission power landing at the areas with other angles or distances may be minimized, so the transmission power utilization efficiency may be improved.

In examples in which the number of antenna elements in antenna array 405-b is above a threshold, holographic MIMO (H-MIMO) may be employed at frequency bands above a threshold frequency (e.g., FR2 in NR or sub-terahertz or terahertz bands). At these frequency spectrums above the threshold frequency, the beamforming mode may be analog beamforming or hybrid beamforming. Accordingly, system performance may depend on the beam sweeping quality and latency.

In some examples, a transmitter panel (e.g., transmitter array) may be located at Z=0. In examples in which the transmitter panel has a phase profile, a 3D waveform targeting a spherical waveform and converging to a point $(x_0, y_0, z')$ may be represented as $$\exp\left[-\frac{i\pi\left[(x-x_0)^2 + (y-y_0)^2\right]}{\lambda r_0}\right],$$

with $r_0 = \sqrt{z'^2 + x_0^2 + y_0^2}$. Additionally in examples in which the transmitter panel has a phase profile, a far-field 2D waveform (in examples in which $$\frac{x^2}{\lambda z'} \ll 1 \text{ and } \frac{y^2}{\lambda z'} \ll 1\right)$$

may be represented as $$\exp\left[\frac{i2\pi(xx_0 + yy_0)}{\lambda r_0}\right] = \exp\left[\frac{i2\pi}{\lambda}(x\sin\theta_{0,x} + y\sin\theta_{0,x})\right],$$

$$\text{where } \sin\theta_{0,x} = \frac{x_0}{r_0} \text{ and } \sin\theta_{0,y} = \frac{y_0}{r_0}.$$

Both 2D and 3D waveforms may exist in a unified framework.

In some examples, a quadratic term may be present with respect to x and y, $$\frac{(x^2 + y^2)}{\lambda r_0},$$

in a 3D waveform which disappears more quickly at a larger distance than linear term which is present in both 3D waveforms and 2D waveforms. Additionally, the 2D phase term may have a format of a discrete Fourier transform (DFT) by taking angle as frequency. The receiver must prepare different weights when transmitting and receiving signals.

Figure 5:
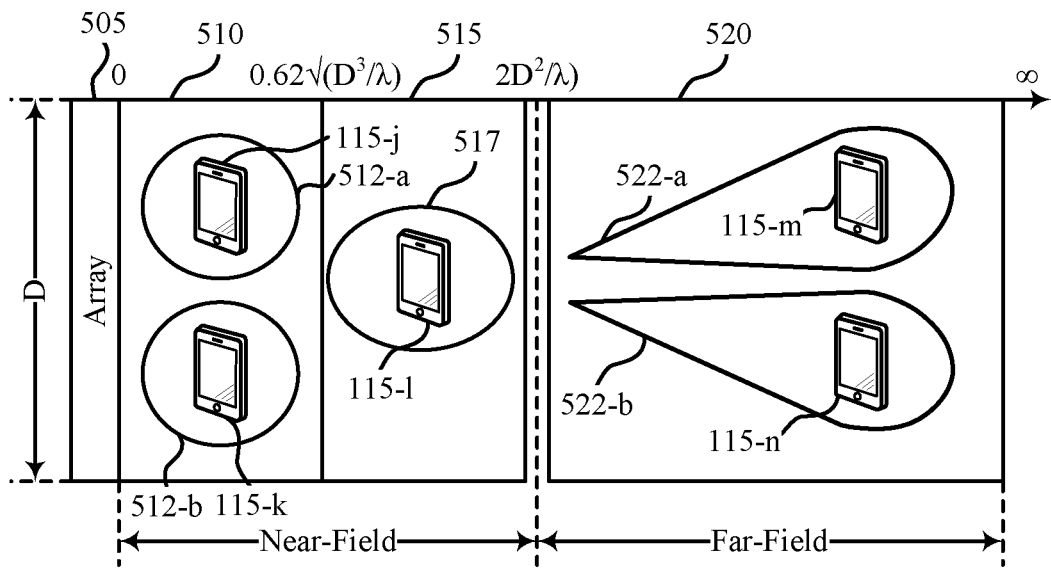
FIG. 5 illustrates an example of a field partitioning scheme that supports holographic-MIMO field type indication in accordance with aspects of the present disclosure.

FIG. 5 illustrates an example of a field partitioning scheme 500 that supports holographic-MIMO field type indication in accordance with aspects of the present disclosure. In some examples, field partitioning scheme 500 may be implemented by one or more aspects of wireless communications system 100. For instance, array 505 may be an example of an antenna array of a base station 105 or a UE 115 as described with reference to FIG. 1. Additionally or alternatively, UEs 115-j, 115-k, 115-l, 115-m, and 115-n may be examples of UEs 115 as described with reference to FIG. 1.

In some examples, the partitioning distance of a near field (e.g., divided into a reactive near field 510 and a radiating near field 515) and a far field 520 may depend on an antenna panel size D and a wavelength λ. The reactive near field 510 may be present from a distance 0 to $0.62\sqrt{D^3/\lambda}$; the radiating near field 515 may be present from $0.62\sqrt{D^3/\lambda}$ to $2D^2/\lambda$, and the far field 520 may be present beyond $2D^2/\lambda$. In some examples, the radiating near field 515 may be equivalent to a Fresnel diffraction zone. In some examples, reactive near field 510 and radiating near field 515 may be associated with holographic MIMO and/or beamforming (e.g., 3D beams around UEs 115). For instance, beam 512-a associated with UE 115-j, beam 512-b associated with UE 115-k, and beam 517 associated with UE 115-l may be examples of 3D or holographic beams. Additionally, the far field 520 may be associated with NR MIMO and/or beamforming (e.g., 2D beams pointing to a UE 115). For instance, beam 522-a associated with UE 115-m and beam 522-b associated with UE 115-n may be examples of 2D beams.

Figure 6A:
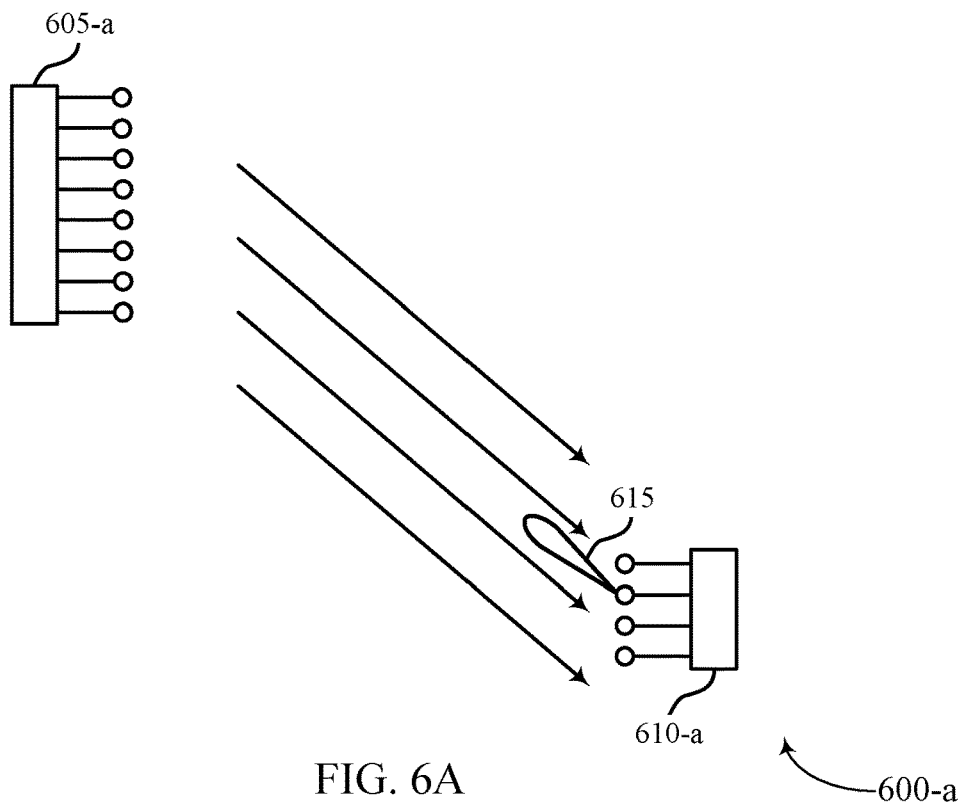
FIGS. 6A and 6B illustrate examples of beam-based wireless communications systems that support holographic-MIMO field type indication in accordance with aspects of the present disclosure.
Figure 6B:
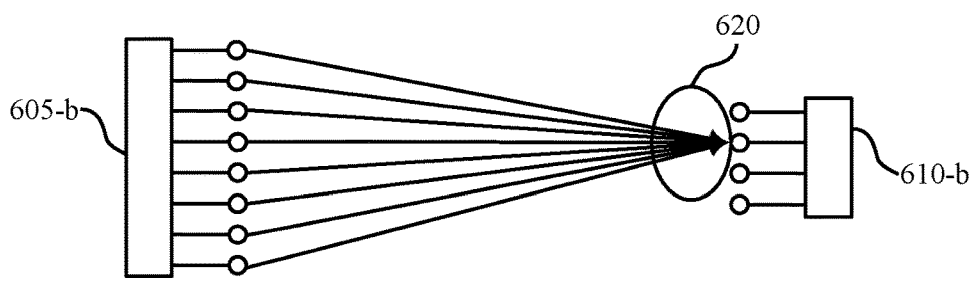

FIGS. 6A and 6B illustrate examples of beam-based wireless communications systems 600-a and 600-b that support holographic-MIMO field type indication in accordance with aspects of the present disclosure. In some examples, beam-based wireless communications systems 600-a and 600-b may be implemented by one or more aspects of wireless communications system 100. For instance, transmitting antenna panels 605-a and 605-b may be an examples of a transmitting antenna panel at a base station 105 or a UE 115 and receiving antenna panels 610-a and 610-b may be examples of receiving antenna panels at a base station 105 or a UE 115. In some examples, transmitting antenna panels 605-a and 605-b and/or receiving antenna panels 610-a and 610-b may each be an example of a uniform linear array (ULA) antenna panel or a uniform planar array (UPA) antenna panel.

Beam-based wireless communications system 600-a may illustrate an example of communications between a transmitting antenna panel 605-a and a receiving antenna panel 610-a in the far field. In some such examples, receiving beam 615 may be an example of a DFT-based beam and transmissions from each antenna element of transmitting antenna panel 605-a may be approximately in parallel.

Beam-based wireless communications system 600-b may illustrate an example of communications between a transmitting antenna panel 605-b and a receiving antenna panel 610-b in the far field. In some such examples, receiving beam 620 may be an example of a non-DFT-based receiving beam and transmissions from each antenna element of transmitting antenna panel 605-b may converge at receiving antenna panel 610-b.

In some examples, the suitable downlink receiving or uplink transmitting beam weights (e.g., beam weight vectors) for far-field (e.g., 2D) beams and near-field (e.g., 3D) beams may be different. When a receiving antenna panel (e.g., of a UE 115) is located in the far-field of a transmitting antenna panel (e.g., of a base station 105), the size of the transmitting antenna panel may be ignored such that the signals arriving at the receiving antenna panel may be approximated as a planar wave. For instance, the channel gains of antennas in the panel may have linear-increased phases and quasi-identical amplitudes. In some such examples, the set of suitable beam weights for the transmitting and receiving antenna arrays may be DFT coefficients.

However, when the receiving antenna panel is located in the near-field of the transmitting antenna panel, the size of the transmitting antenna panel may not be ignored. Accordingly, the signals arriving at the receiving antenna panel may not be approximated as a planar wave. In some such examples, the suitable beam weight for transmitting antenna panels and receiving antenna panels may no longer be DFT coefficients. Another set of suitable beamforming weights (e.g., not-DFT based, which may have a beam wider than DFT-based beams) may be used in the transmitting antenna panels and/or the receiving antenna panel. Without information on the field type (e.g., 2D beams or 3D beams) of the transmitting panel beamforming, in the initial beam setup stage or beam tracking state, the receiving antenna panel may go through two sets of beamforming weights before it determines the beam to use (e.g., a downlink receiving beam or an uplink transmitting beam). However, going through two sets of beamforming weights may be associated with a longer latency of beam management than going through one of the two sets of beamforming weights.

Figure 7A:
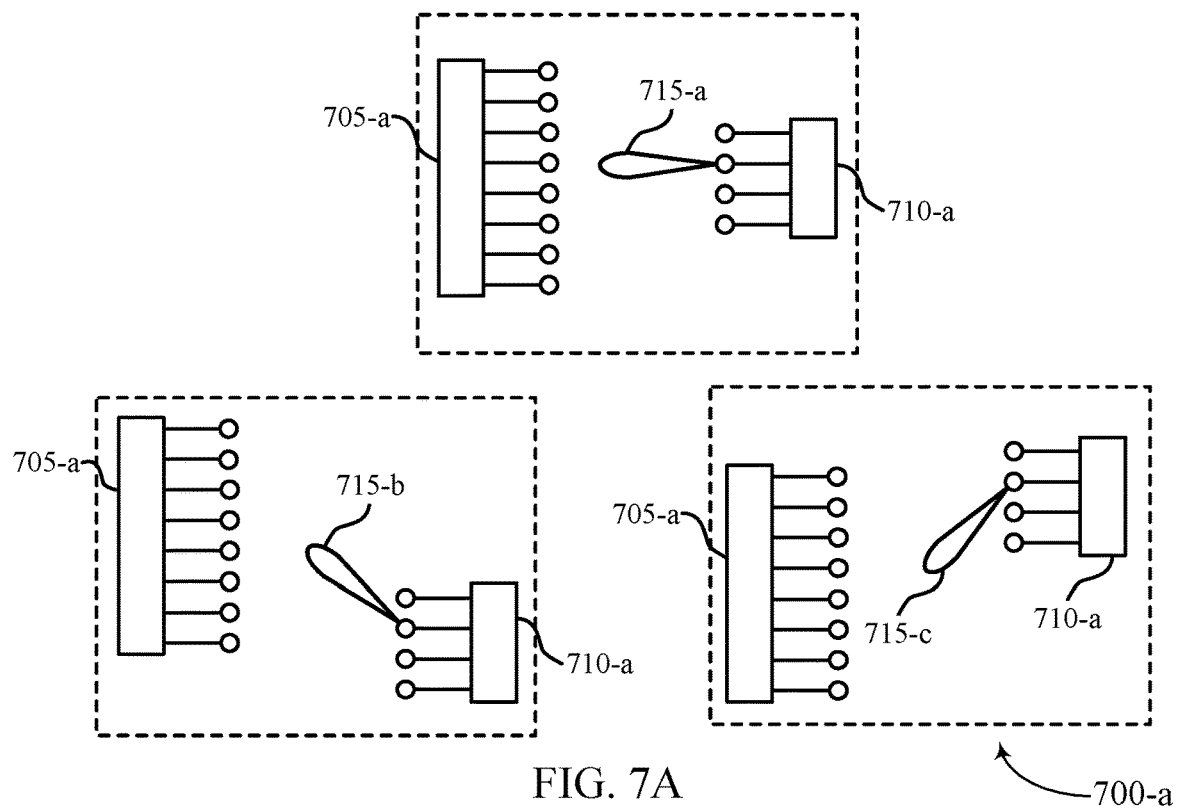
FIGS. 7A and 7B illustrate examples of beam configuration schemes that support holographic-MIMO field type indication in accordance with aspects of the present disclosure.
Figure 7B:
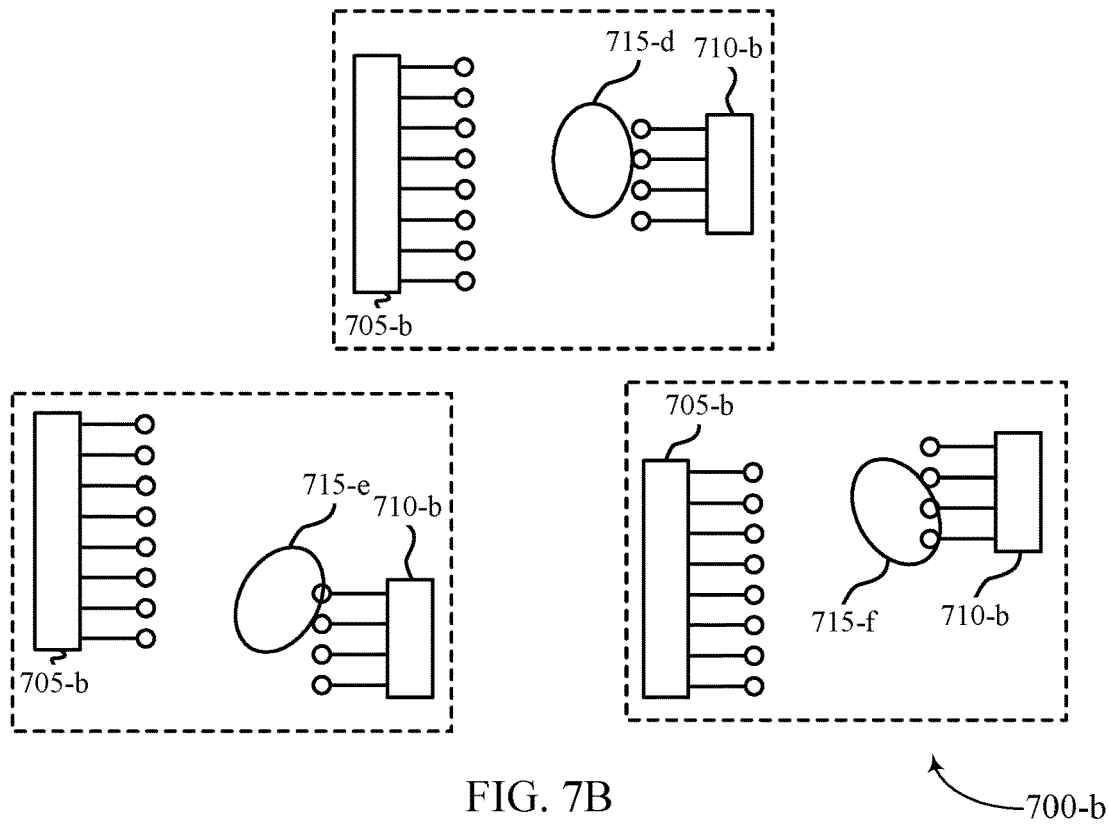

FIGS. 7A and 7B illustrate examples of beam configuration schemes 700-a and 700-b that support holographic-MIMO field type indication in accordance with aspects of the present disclosure. In some examples, beam configuration schemes 700-a and 700-b may be implemented by one or more aspects of wireless communications system 100. For instance, transmitting antenna panels 705-a and 705-b may be an examples of a transmitting antenna panel at a base station 105 or a UE 115 and receiving antenna panels 710-a and 710-b may be examples of receiving antenna panels at a base station 105 or a UE 115.

Beam configuration scheme 700-a may illustrate an example of different beams used for communications between a transmitting antenna panel 605-a and a receiving antenna panel 610-a in the far field. For example, beams 715-a, 715-b, and 715-c may be examples of different beams that receiving antenna panel 610-a may sweep through when performing communications in the far-field (e.g., 2D beams).

Beam configuration scheme 700-b may illustrate an example of different beams used for communications between a transmitting antenna panel 605-b and a receiving antenna panel 610-b in the near field. For examples, beams 715-d, 715-e, and 715-c may be examples of different beams that receiving antenna panel 610-b may sweep through when performing communications in the near-field (e.g., 3D beams). It should be noted that beams 715-a, 715-b, and 715-c may not be drawn proportionally to beams 715-d, 715-e, and 715-f and may be drawn in this manner for illustrative purposes.

In some examples, if the device of receiving antenna panel 710-a or 710-b has failed to determine whether the device is in the near field or the far field, the device may sweep through both a first set of beams including beams 715-a, 715-b, and 715-c and a second set of beams including beams 715-d, 715-e, and 715-f. Sweeping through both the first set of beams and the second set of beams may increase latency associated with the beam sweep relative to sweeping through one of the first set of beams and the second set of beams.

Figure 8A:
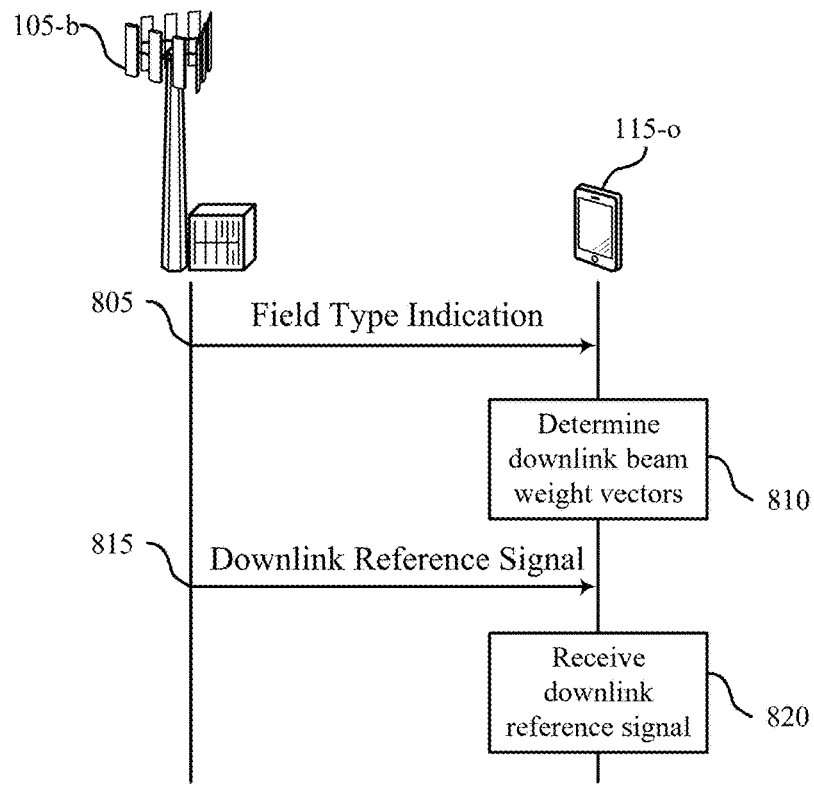
FIGS. 8A and 8B illustrate examples of process flows that support holographic-MIMO field type indication in accordance with aspects of the present disclosure.
Figure 8B:
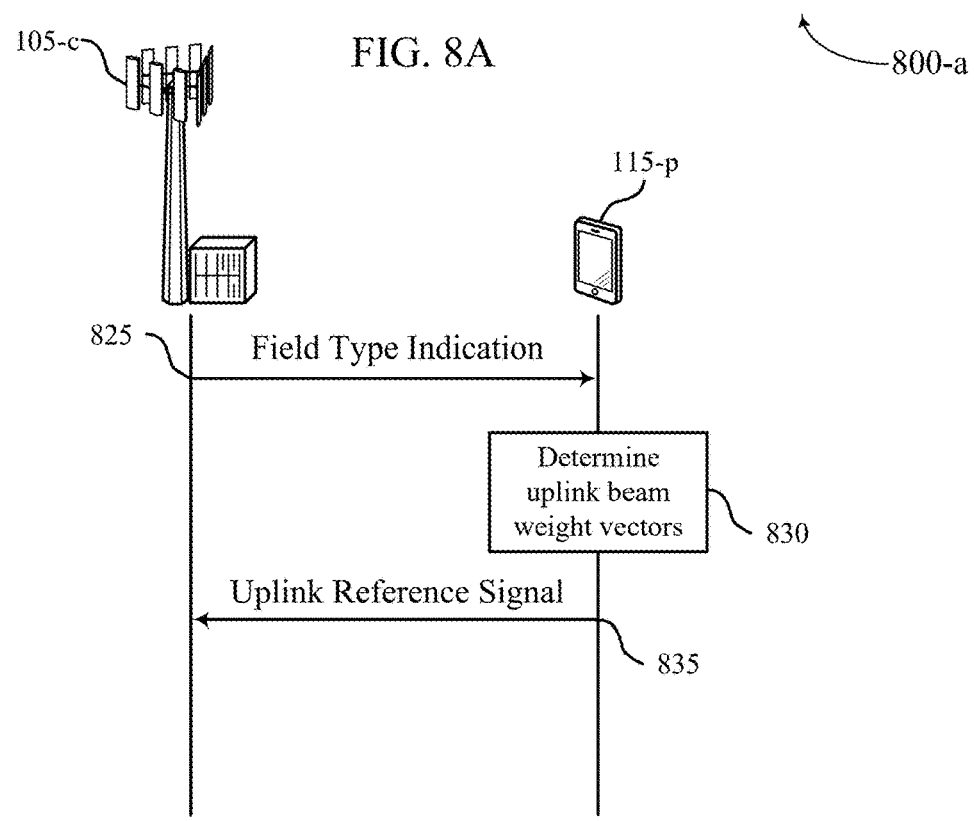

FIGS. 8A and 8B illustrate examples of process flows 800-a and 800-b that support holographic-MIMO field type indication in accordance with aspects of the present disclosure. In some examples, process flows 800-a and 800-b may be implemented by one or more aspects of FIG. 1. For instance, base stations 105-b and 105-c may be examples of base stations 105 as described with reference to FIG. 1 and UEs 115-o and 115-p may be examples of UEs 115 as described with reference to FIG. 1. In some examples, the methods described herein may be applied when base station 105-*b* or 105-*c* is substituted with another wireless device, such as a UE 115 and/or when UE 115-*o* or 115-*p* is substituted with another wireless device, such as a base station 105. In some examples, the methods described herein may occur during an initial beam setup stage or a beam tracking stage. Additionally, base stations 105-*b* and 105-*c* may be examples of holographic MIMO systems (e.g., base stations 105-*b* and 105-*c* may be equipped with holographic-MIMO antenna panels).

At 805, base station 105-*b* may transmit, to UE 115-*o*, an indication of a field type of a field between base station 105-*b* and UE 115-*o*. For instance, base station 105-*b* may indicate, to UE 115-*o*, a field type value (e.g., near field or far field) of downlink beams in an explicit or implicit way. The field type value may be associated with downlink reference signal resources, such as SSB or CSI-RS resources.

At 810, UE 115-*o* may determine a set of downlink beam weight vectors associated with the field type. For instance, UE 115-*o* may select between a first set of downlink beam weight vectors and a second set of downlink beam weight vectors based on the field type.

At 815, base station 105-*b* may transmit, to UE 115-*o*, a downlink reference signal, such as a synchronization signal or a CSI-RS. At 820, UE 115-*o* may receive the downlink reference signal using a beam generated using a first beam weight vector from the determined and/or selected set of downlink beam weight vectors.

At 825, base station 105-*c* may transmit, to UE 115-*p*, an indication of a field type between base station 105-*b* and UE 115-*p*. For instance, base station 105-*c* may indicate, to UE 115-*o*, a field type value (e.g., near field or far field) of uplink beams in an explicit or implicit way. The field type value may be associated with uplink reference signal resources, such as SRS resources.

At 830, UE 115-*p* may determine a set of uplink beam weight vectors associated with the field type. For instance, UE 115-*p* may select between a first set of uplink beam weight vectors and a second set of uplink beam weight vectors based on the field type.

At 835, UE 115-*p* may transmit, to base station 105-*c*, an uplink reference signal, such as an SRS, using a beam generated using a first beam weight vector from the determined and/or selected set of uplink beam weight vectors.

In some examples, a base station (e.g., base station 105-*b* at 805 or base station 105-*c* at 825) may send control signaling indicating the field type value of a reference signal resource (e.g., an SRS resource, an SSB resource, a CSI-RS resource) or of a resource set (e.g., a CSI-RS resource set, an SRS resource set). In some examples, the control signaling may include an explicit indication. For instance, the indicated field type value may be a hard value (e.g., two choices between a near field or a far field) or may be a soft value (e.g., a real value of an integer number, where the larger value maps to a higher likelihood of a far field and the smaller value maps to a higher likelihood of being in the near field. Additionally or alternatively, the control signaling may include an implicit indication. For instance, the base station may indicate that the field type of an SRS, SSB, or CSI-RS is identical to a field type of another SSB CSI-RS, or SRS, where the field type of the other SRS, SSB, or CSI-RS may be preconfigured at or previously indicated to the corresponding UE.

In some examples, these SRS, SSB, or CSI-RS resources may be associated with a TRP, a cell, or a BWP. If a cell or UE is configured with multiple TRPs, each TRP may have different field type values. Additionally or alternatively, each channel (e.g., each data channel or control channel) may have its own field type value. In some examples, the beam type or field type may be specific to each physical channel (e.g., data channel control channel) or signal. Additionally or alternatively, the beam type or field type may be specific to a particular beam for the same channel. For instance, SSB may use 2D beams, which may enable wider coverage, but CSI-RS may use 2D beams and 3D beams, which may enable accommodating different users as well as adaptability to increase or account for mobility.

After receiving the field type value of a reference signal resource (e.g., an SRS resource, a CSI-RS resource, an SSB resource), the UE may determine a beam (e.g., an optimal transmitting or receiving beam) or multiple transmitting beams based on it. For instance, if the field type value is far-field, the UE may sweep DFT-based beams or a first set of beams to communicate a reference signal before determining a beam (e.g., the optimal transmitting or receiving beam). If the field type value is near-field, the UE may sweep non-DFT based beams or a second set of beams to communicate the reference signal before determining the beam (e.g., the optimal transmitting or receiving beam). Performing the sweep in this manner may decrease a portion (e.g., half) of beam sweeping latency compared to sweeping with both DFT-based beams and non-DFT-based beams and/or sweeping with a first set of beams and a second set of beams in examples in which the base station does not indicate field type.

In some examples, the indication of the field type value of downlink beams and/or uplink beams may be done via RRC signaling, MAC-CE signaling, DCI signaling, UCI signaling, or SCI signaling. For instance, the indication of the field type may be done by dedicated signal to one wireless device, such as a UE (e.g., dedicated RRC signaling, dedicated MAC-CE signaling, dedicated DCI signaling, dedicated UCI signaling, or dedicated SCI signaling). Additionally or alternatively, the signaling may be done by common signaling to multiple wireless devices or each wireless device of a set of wireless devices (e.g., by a system information message, a common MAC-CE, such as a MAC-CE in multicast physical downlink shared channel (PDSCH), a group-common DCI, a group-common UCI, or a group-common SCI).

In some examples, the method described herein may be associated with one or more advantages. For instance, the present disclosure may propose a scheme for a base station to indicate the field type value of downlink beams and/or uplink beams. Using this field type value, the UE may determine one or more downlink receiving beams and/or uplink transmitting beams by considering the beams corresponding to the indicated field type value. Compared with uses cases without this indication, the UE may reduce the beam determination latency in the initial beam setup stage and/or the beam tracking stage.

Figure 9A:
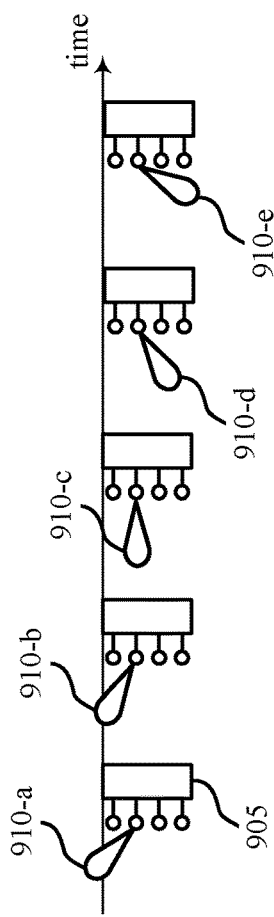
FIGS. 9A, 9B, and 9C illustrate examples of beam configuration schemes that support holographic-MIMO field type indication in accordance with aspects of the present disclosure.
Figure 9B:
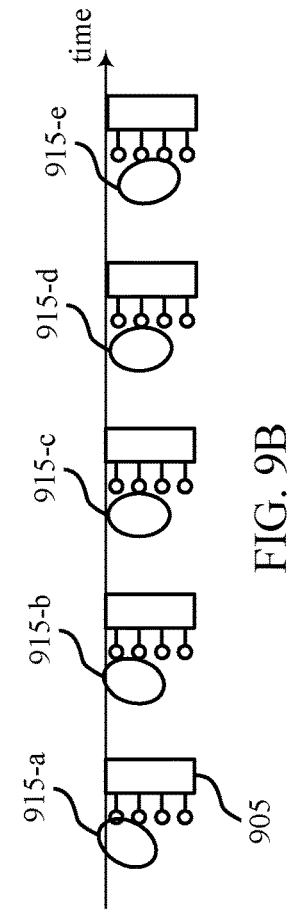
Figure 9C:
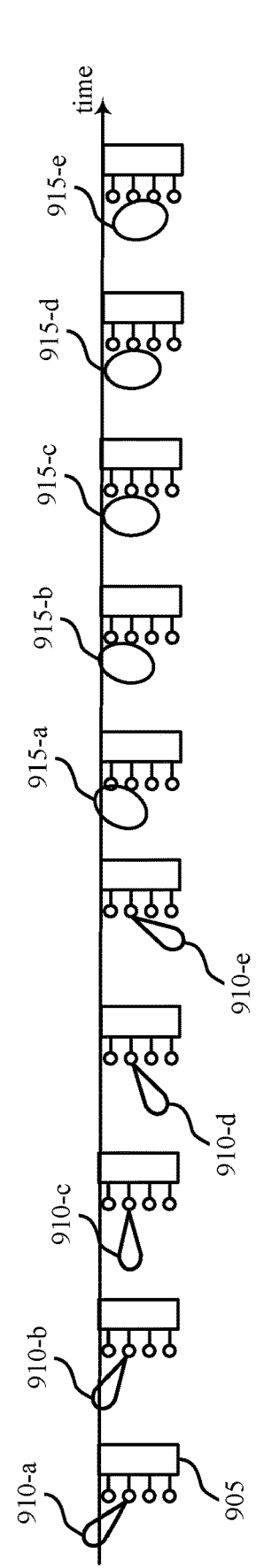

FIGS. 9A, 9B, and 9C illustrate examples of beam configuration schemes 900-*a*, 900-*b*, and 900-*c* that supports holographic-MIMO field type indication in accordance with aspects of the present disclosure. In some examples, beam configuration schemes 900-*a*, 900-*b*, and 900-*c* may be implemented by one or more aspects of wireless communications system 100. For instance, antenna panels 905 may be an example of an antenna panel at a base station 105 or a UE 115.

Beam configuration scheme 900-*a* may illustrate an example of a first beam sweeping procedure. For instance, beam configuration scheme 900-*a* may illustrate antenna panel 905 sweeping through a first set of beams including beams 910-a, 910-b, 910-c, 910-d, and 910-e. Each beam of the first set of beams may be an example of a 2D beam.

Beam configuration scheme 900-b may illustrate an example of a second beam sweeping procedure. For instance, beam configuration scheme 900-b may illustrate antenna panel 905 sweeping through a second set of beams including beams 915-a, 915-b, 915-c, 915-d, and 915-e. Each beam of the second set of beams may be an example of a 3D or holographic beam.

Beam configuration scheme 900-c may illustrate an example of a third beam sweeping procedure. For instance, beam configuration scheme 900-c may illustrate antenna panel 905 sweeping through both the first set of beams (e.g., beams 910-a, 910-b, 910-c, 910-d, and 910-e) and the second set of beams (e.g., beams 915-a, 915-b, 915-c, 915-d, and 915-e). In some examples, the beam sweeping of beam configuration scheme 900-c may be associated with a longer latency than the beam sweeping of beam configuration schemes 900-a and 900-b (e.g., due to beam configuration scheme 900-c being associated with a greater number of beams than beam configuration schemes 900-a and 900-b).

In some examples, the methods described herein may describe the behavior of the antenna panel 905 after receiving an indication of beams (e.g., downlink beams). For instance, after receiving the field type value of a reference signal resource (e.g., SRS resource, SSB resource, CSI-RS resource), the antenna panel 905 may determine a beam or multiple beams (e.g., receiving beams, downlink beams) based on the field type value. For instance, if the field type value is far field, the antenna panel 905 may sweep DFT-based beams or a first set of beams to communicate the reference signal (e.g., periodic CSI-RS) before determining the beam (e.g., as shown with reference to beam configuration scheme 900-a). Additionally or alternatively, if the field type value is near-field, the antenna panel 905 may sweep non-DFT-based beams or a second set of beams to communicate the reference signal before determining the beam (e.g., as shown with reference to beam configuration scheme 900-b). Accordingly, a portion (e.g., half) of beam sweeping latency may be reduced compared with sweeping both DFT-based beams and non-DFT-based based and/or sweeping both the first set of beams and the second set of beams (e.g., as shown with reference to beam configuration scheme 900-c) in examples in which the field type is not indicated.

Figure 10:
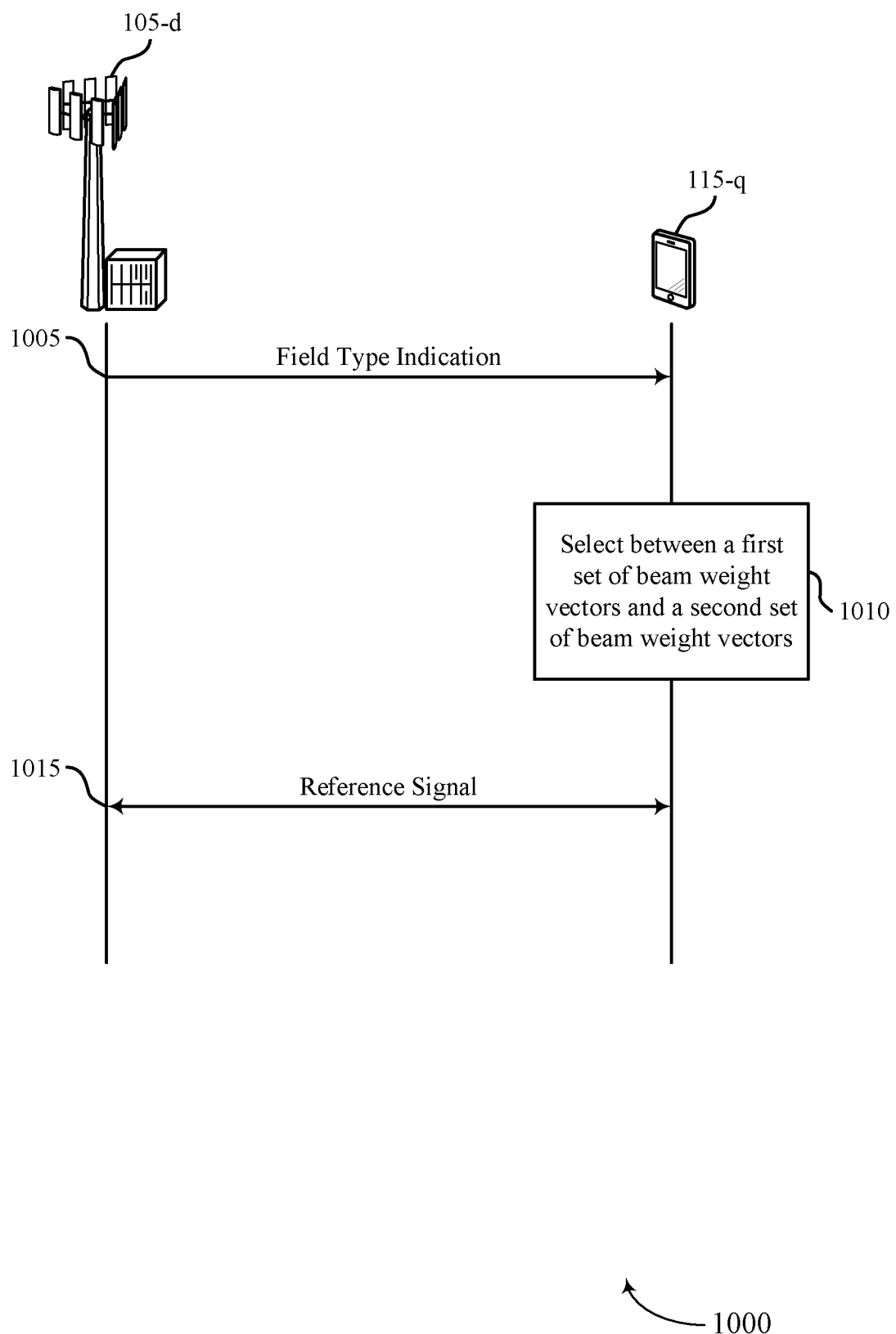
FIG. 10 illustrates an example of a process flow that supports holographic-MIMO field type indication in accordance with aspects of the present disclosure.

FIG. 10 illustrates an example of a process flow 1000 that supports holographic-MIMO field type indication in accordance with aspects of the present disclosure. In some examples, process flow 1000 may be implemented by one or more aspects of FIG. 1. For instance, base station 105-d may be an example of a base station 105 as described with reference to FIG. 1 and UE 115-q may be an example of a UE 115 as described with reference to FIG. 1. In some examples, the methods described herein may be applied when base station 105-d is substituted with another wireless device, such as a UE 115 and/or when UE 115-q is substituted with another wireless device, such as a base station 105.

At 1005, base station 105-d may transmit, to UE 115-q, an indication of a field type of a field between UE 115-q and base station 105-d. In some examples, the indication may include one or more bits indicating the field type, where each value of the one or more bits corresponds to a respective field type of a set of field types. In some examples, the indication may include a measure indicating a likelihood that the field type includes a first field type as compared to a second field type. In some examples, the indication may indicate that the field type is the same as a second field type configured at UE 115-q for a reference signal resource. In some examples, the indication of the field type may be communicated via RRC signaling, MAC-CE signaling, DCI signaling, UCI signaling (e.g., in examples in which base station 105-d is substituted with a UE 115 and UE 115-q is substituted with a base station 105), SCI signaling (e.g., in examples in which base station 105-d is substituted with a UE 115), or any combination thereof.

In some examples, base station 105-d may include or may be an example of a TRP. In some such examples, UE 115-q may receive (e.g., from base station 105-d), during a time when UE 115-q is configured to communicate with base station 105-d, an indication of a field type between UE 115-q and another TRP. Additionally or alternatively, the indication of the field type may be for one of a control channel or a data channel. In some such examples, base station 105-d may transmit, to UE 115-q, an indication of a second field type for the other of the control channel or the data channel. Additionally or alternatively, the indication of the field type is for the beam of a channel. In some such examples, base station 105-d may transmit, to UE 115-q, an indication of a second field type for a second beam of the channel. In some examples, the field type includes an indication that UE 115-q is in a near-field relative to base station 105-d or that UE 115-q is in a far-field relative to base station 105-d.

At 1010, UE 115-q may select between a first set of beam weight vectors and a second set of beam weight vectors based on the field type. In some examples, UE 115-q may perform the selecting based on receiving the one or more bits, the measure, the indication that the field type is the same as the second field type, or any combination thereof. In some examples, the first set of beam weight vectors is associated with a first codebook for two-dimensional beams and the second set of beam weight vectors is associated with a second codebook for three-dimensional beams. In some such examples, the indication of the field indicates to select one of the first codebook or the second codebook and selecting between the first set of beam weight vectors and the second set of beam weight vectors includes selecting between the first codebook or the second codebook.

At 1015, UE 115-q may communicate with base station 105-d a reference signal using a beam generated using a first beam weight vector from the selected set of beam weight vectors. In some examples, UE 115-q communicating the reference signal may include UE 115-q performing a beam sweep procedure using a set of beams corresponding to the selected set of beam weight vectors, where each beam of the set of beams is generated using a respective beam weight vector of the selected set of beam weight vectors. In examples in which UE 115-d selects between the first codebook or the second codebook, communicating the reference signal may include performing a beam sweep procedure using one or more beams generated using the selected codebook. In some examples, communicating the reference signal includes base station 105-d transmitting, to UE 115-q, the reference signal that is a synchronization signal (e.g., an SSB), a CSI-RS, or both, where UE 115-q uses the beam to receive the reference signal. Additionally or alternatively, communicating the reference signal may include UE 115-q transmitting, to base station 105-d, the reference signal that is an SRS, where UE 115-q uses the beam to transmit the reference signal.

Figure 11:
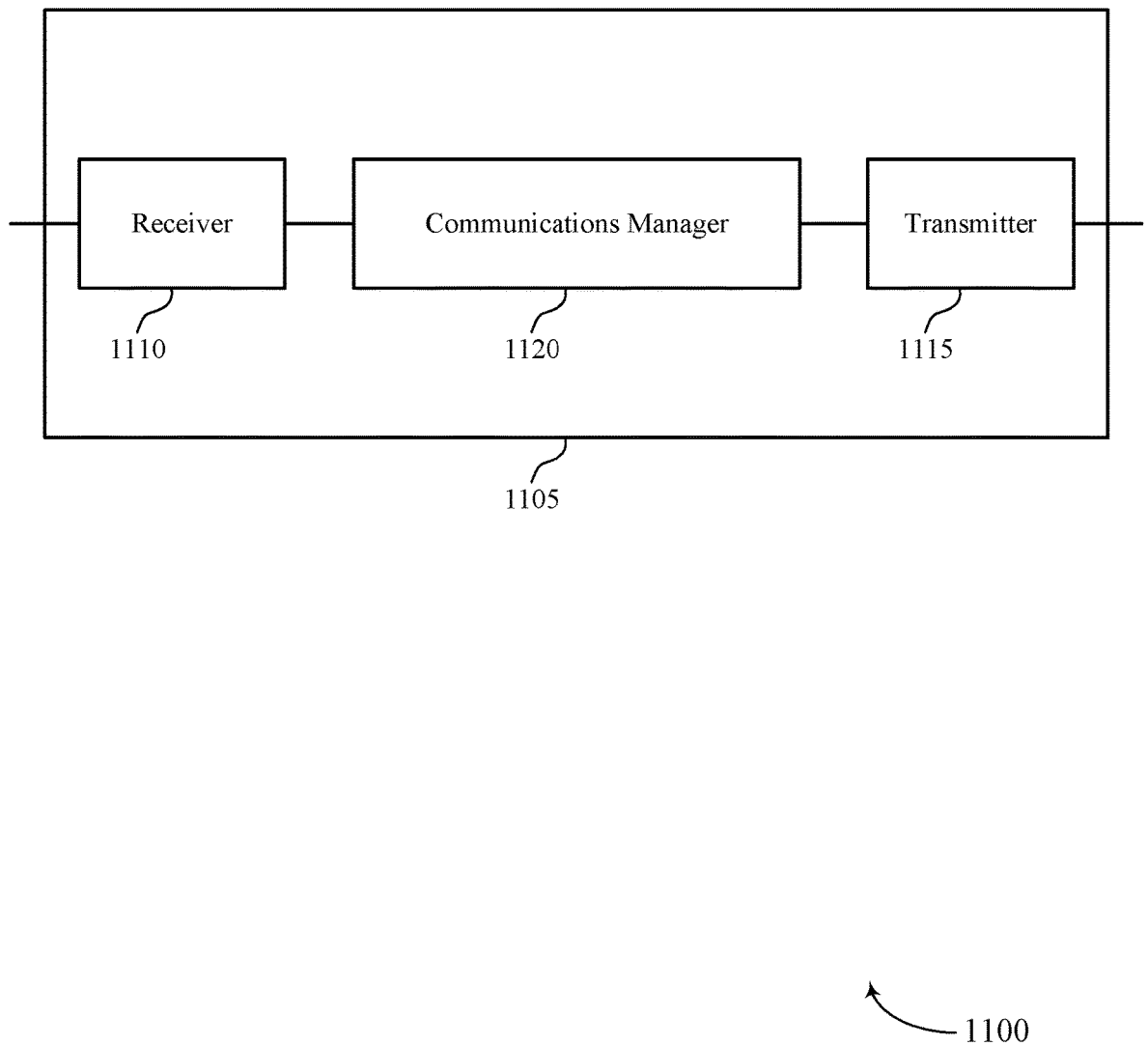
FIGS. 11 and 12 show diagrams of devices that support holographic-MIMO field type indication in accordance with aspects of the present disclosure.

FIG. 11 shows a diagram 1100 of a device 1105 that supports holographic-MIMO field type indication in accordance with aspects of the present disclosure. The device 1105 may be an example of aspects of a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to holographic-MIMO field type indication). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to holographic-MIMO field type indication). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of holographic-MIMO field type indication as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a UE in accordance with examples as disclosed herein. For example, the communications manager 1120 may be configured as or otherwise support a means for receiving, from a wireless device, an indication of a field type of a field between the UE and the wireless device. The communications manager 1120 may be configured as or otherwise support a means for selecting between a first set of beam weight vectors and a second set of beam weight vectors based on the field type. The communications manager 1120 may be configured as or otherwise support a means for communicating a reference signal with the wireless device using a beam generated using a first beam weight vector from the selected set of beam weight vectors.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for the device 1105 to reduce a number of beams that the device 1105 sweeps through during a beam sweep procedure. Reducing the number of beams may reduce latency associated with performing the beam sweep procedure.

Figure 12:
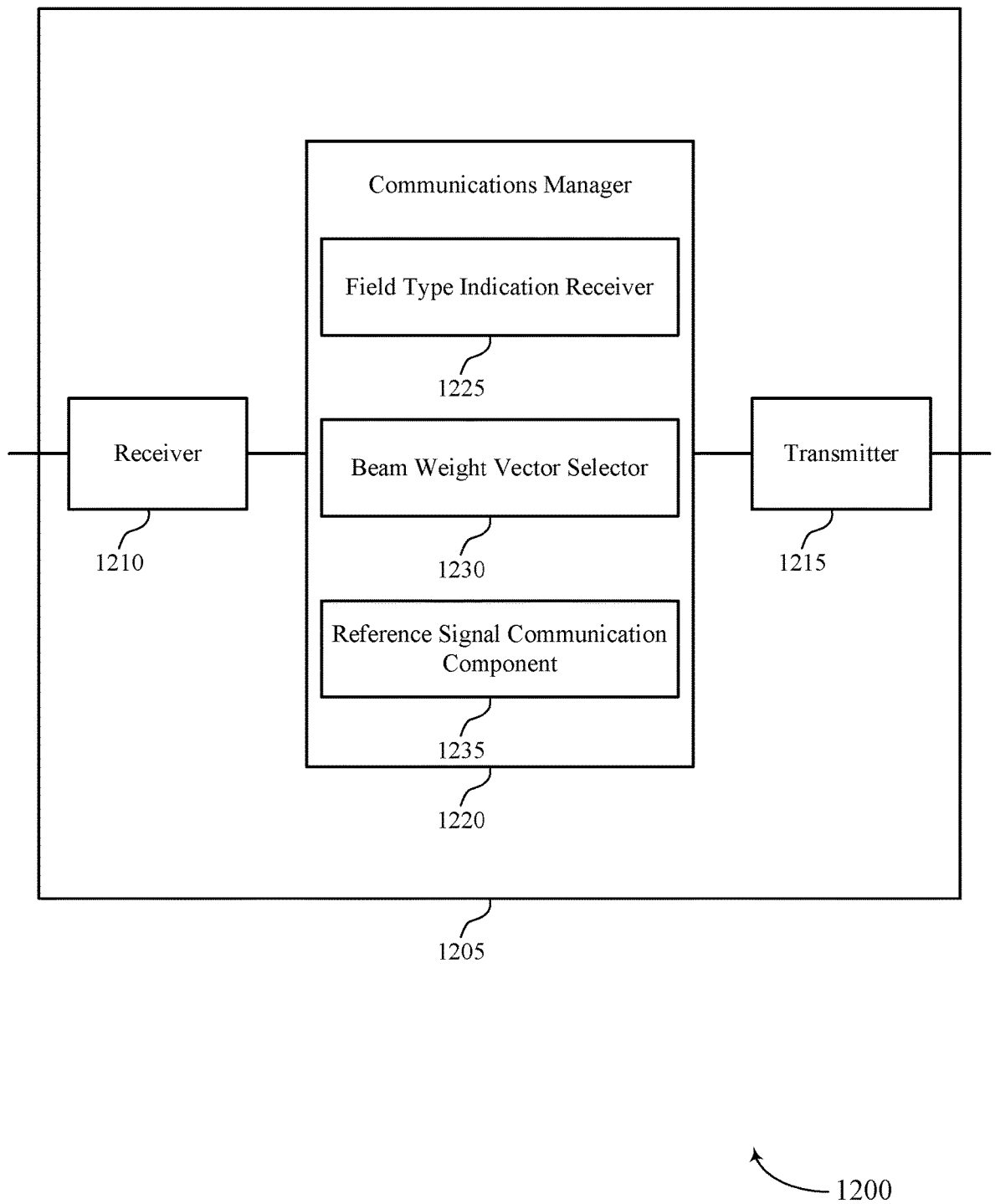

FIG. 12 shows a diagram 1200 of a device 1205 that supports holographic-MIMO field type indication in accordance with aspects of the present disclosure. The device 1205 may be an example of aspects of a device 1105 or a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to holographic-MIMO field type indication). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to holographic-MIMO field type indication). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of holographic-MIMO field type indication as described herein. For example, the communications manager 1220 may include a field type indication receiver 1225, a beam weight vector selector 1230, a reference signal communication component 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a UE in accordance with examples as disclosed herein. The field type indication receiver 1225 may be configured as or otherwise support a means for receiving, from a wireless device, an indication of a field type of a field between the UE and the wireless device. The beam weight vector selector 1230 may be configured as or otherwise support a means for selecting between a first set of beam weight vectors and a second set of beam weight vectors based on the field type. The reference signal communication component 1235 may be configured as or otherwise support a means for communicating a reference signal with the wireless device using a beam generated using a first beam weight vector from the selected set of beam weight vectors.

Figure 13:
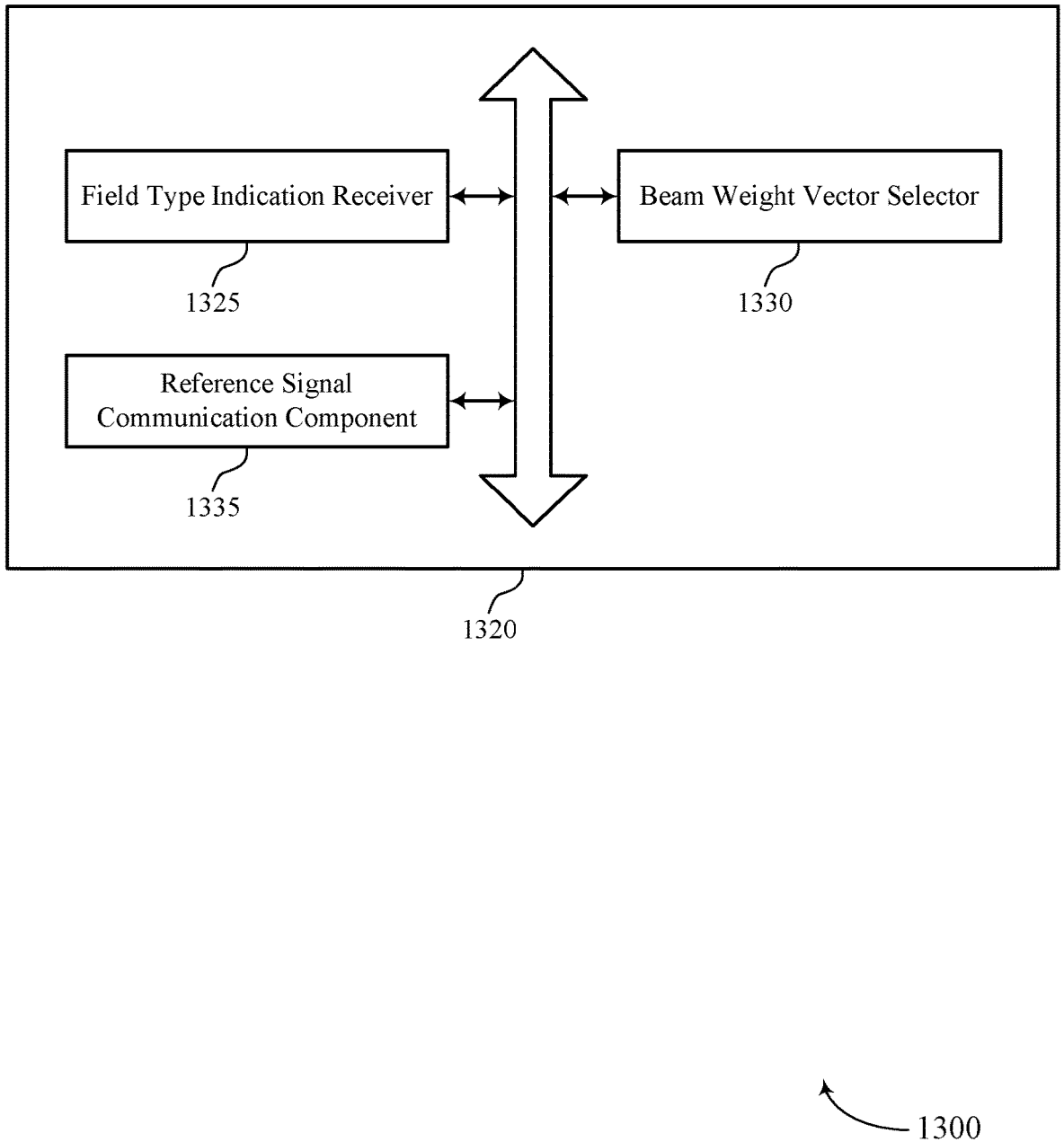
FIG. 13 shows a diagram of a communications manager that supports holographic-MIMO field type indication in accordance with aspects of the present disclosure.

FIG. 13 shows a diagram 1300 of a communications manager 1320 that supports holographic-MIMO field type indication in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of holographic-MIMO field type indication as described herein. For example, the communications manager 1320 may include a field type indication receiver 1325, a beam weight vector selector 1330, a reference signal communication component 1335, or any combination thereof. Each of these components may communicate, directly or indirectly, with one another (e.g., via one or more buses).

The communications manager 1320 may support wireless communication at a UE in accordance with examples as disclosed herein. The field type indication receiver 1325 may be configured as or otherwise support a means for receiving, from a wireless device, an indication of a field type of a field between the UE and the wireless device. The beam weight vector selector 1330 may be configured as or otherwise support a means for selecting between a first set of beam weight vectors and a second set of beam weight vectors based on the field type. The reference signal communication component 1335 may be configured as or otherwise support a means for communicating a reference signal with the wireless device using a beam generated using a first beam weight vector from the selected set of beam weight vectors.

In some examples, to support communicating the reference signal, the reference signal communication component 1335 may be configured as or otherwise support a means for performing a beam sweep procedure using a set of multiple beams corresponding to the selected set of beam weight vectors, where each beam of the set of multiple beams is generated using a respective beam weight vector of the selected set of beam weight vectors.

In some examples, to support receiving the indication of the field type, the field type indication receiver 1325 may be configured as or otherwise support a means for receiving one or more bits indicating the field type, where each value of the one or more bits corresponds to a respective field type of a set of field types, and where selecting between the first set of beam weight vectors and the second set of beam weight vectors is based on the one or more bits.

In some examples, to support receiving the indication of the field type, the field type indication receiver 1325 may be configured as or otherwise support a means for receiving a measure indicating a likelihood that the field type includes a first field type as compared to a second field type, where selecting between the first set of beam weight vectors and the second set of beam weight vectors is based on receiving the measure indicating the likelihood.

In some examples, to support receiving the indication of the field type, the field type indication receiver 1325 may be configured as or otherwise support a means for receiving an indication that the field type is the same as a second field type configured at the UE for a reference signal resource, where selecting between the first set of beam weight vectors and the second set of beam weight vectors is based on receiving the indication that the field type is the same as the second field type.

In some examples, the first set of beam weight vectors is associated with a first codebook for two-dimensional beams and the second set of beam weight vectors is associated with a second codebook for three-dimensional beams. In some examples, to support receiving the indication of the field type, the field type indication receiver 1325 may be configured as or otherwise support a means for receiving the indication of the field type that indicates to select one of the first codebook or the second codebook, where selecting between the first set of beam weight vectors and the second set of beam weight vectors includes selecting between the first codebook or the second codebook based on the indication of the field type, and where communicating the reference signal includes performing a beam sweep procedure using one or more beams generated using the selected codebook.

In some examples, to support communicating the reference signal, the reference signal communication component 1335 may be configured as or otherwise support a means for receiving, from the wireless device, the reference signal that is a synchronization signal, a channel state information reference signal, or both, using the beam.

In some examples, to support communicating the reference signal, the reference signal communication component 1335 may be configured as or otherwise support a means for transmitting, to the wireless device, the reference signal that is a sounding reference signal using the beam.

In some examples, to support receiving the indication of the field type, the field type indication receiver 1325 may be configured as or otherwise support a means for receiving the indication of the field type via radio resource control signaling, medium access control (MAC) control element (MAC-CE) signaling, downlink control information signaling, uplink control information signaling, sidelink control information signaling, or any combination thereof.

In some examples, the wireless device includes a first transmission reception point, and the field type indication receiver 1325 may be configured as or otherwise support a means for receiving, during a time when the UE is configured to communicate with the first transmission reception point, an indication of a field type between the UE and a second transmission reception point.

In some examples, the indication of the field type is for one of a control channel or a data channel, and the field type indication receiver 1325 may be configured as or otherwise support a means for receiving, from the wireless device, an indication of a second field type for the other of the control channel or the data channel.

In some examples, the indication of the field type is for the beam of a channel, and the field type indication receiver 1325 may be configured as or otherwise support a means for receiving, from the wireless device, an indication of a second field type for a second beam of the channel.

In some examples, the field type includes an indication that the UE is in a near-field relative to the wireless device or that the UE is in a far-field relative to the wireless device.

Figure 14:
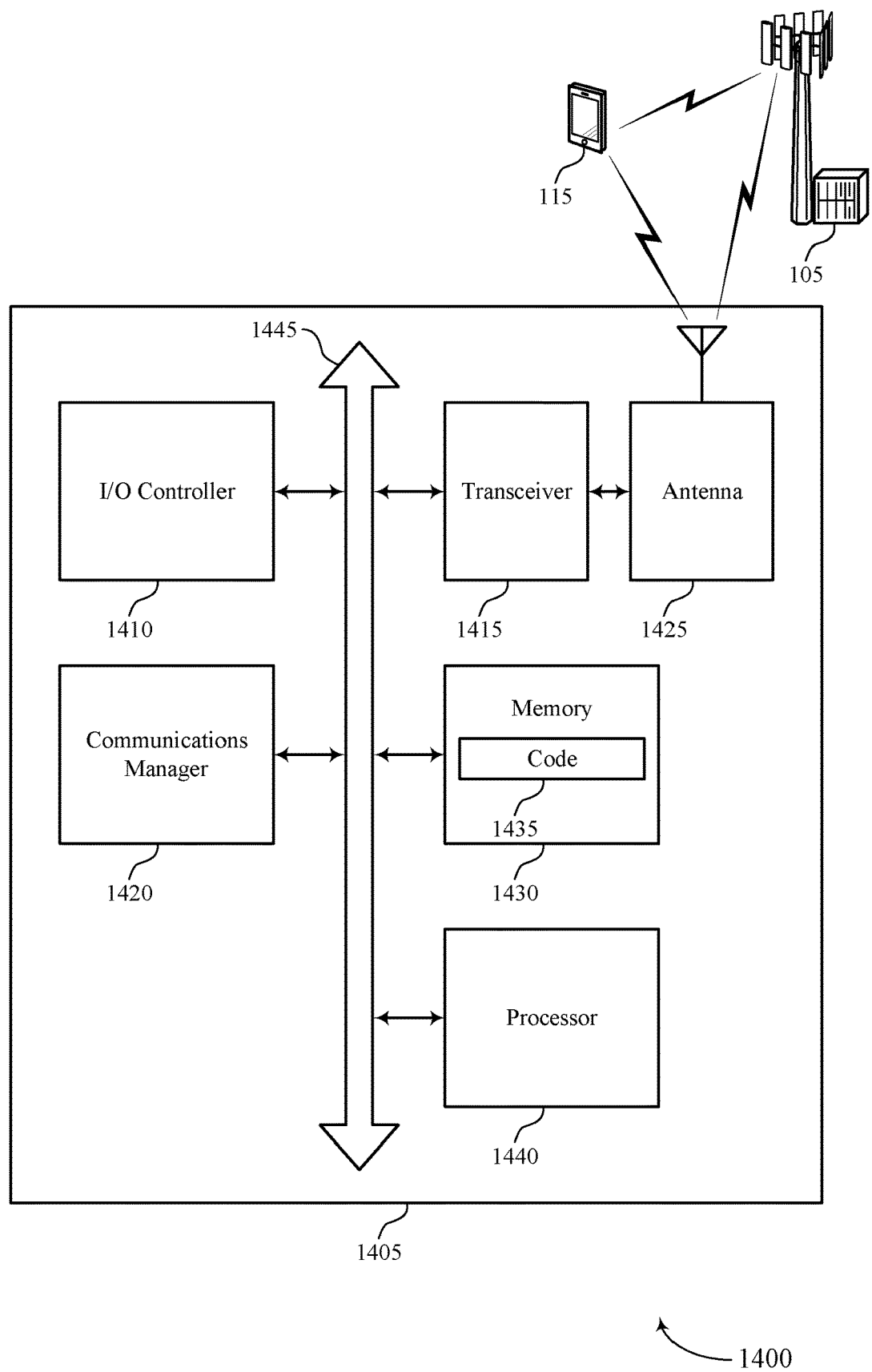
FIG. 14 shows a diagram of a system including a device that supports holographic-MIMO field type indication in accordance with aspects of the present disclosure.

FIG. 14 shows a diagram of a system 1400 including a device 1405 that supports holographic-MIMO field type indication in accordance with aspects of the present disclosure. The device 1405 may be an example of or include the components of a device 1105, a device 1205, or a UE 115 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting holographic-MIMO field type indication). For example, the device 1405 or a component of the device 1405 may include a processor 1440 and memory 1430 coupled to the processor 1440, the processor 1440 and memory 1430 configured to perform various functions described herein.

The communications manager 1420 may support wireless communication at a UE in accordance with examples as disclosed herein. For example, the communications manager 1420 may be configured as or otherwise support a means for receiving, from a wireless device, an indication of a field type of a field between the UE and the wireless device. The communications manager 1420 may be configured as or otherwise support a means for selecting between a first set of beam weight vectors and a second set of beam weight vectors based on the field type. The communications manager 1420 may be configured as or otherwise support a means for communicating a reference signal with the wireless device using a beam generated using a first beam weight vector from the selected set of beam weight vectors.

By including or configuring the communications manager 1420 in accordance with examples as described herein, the device 1405 may support techniques for device 1405 to reduce a number of beams that the device 1405 sweeps through during a beam sweep procedure. Reducing the number of beams may reduce latency associated with performing the beam sweep procedure.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of holographic-MIMO field type indication as described herein, or the processor 1440 and the memory 1430 may be otherwise configured to perform or support such operations.

Figure 15:
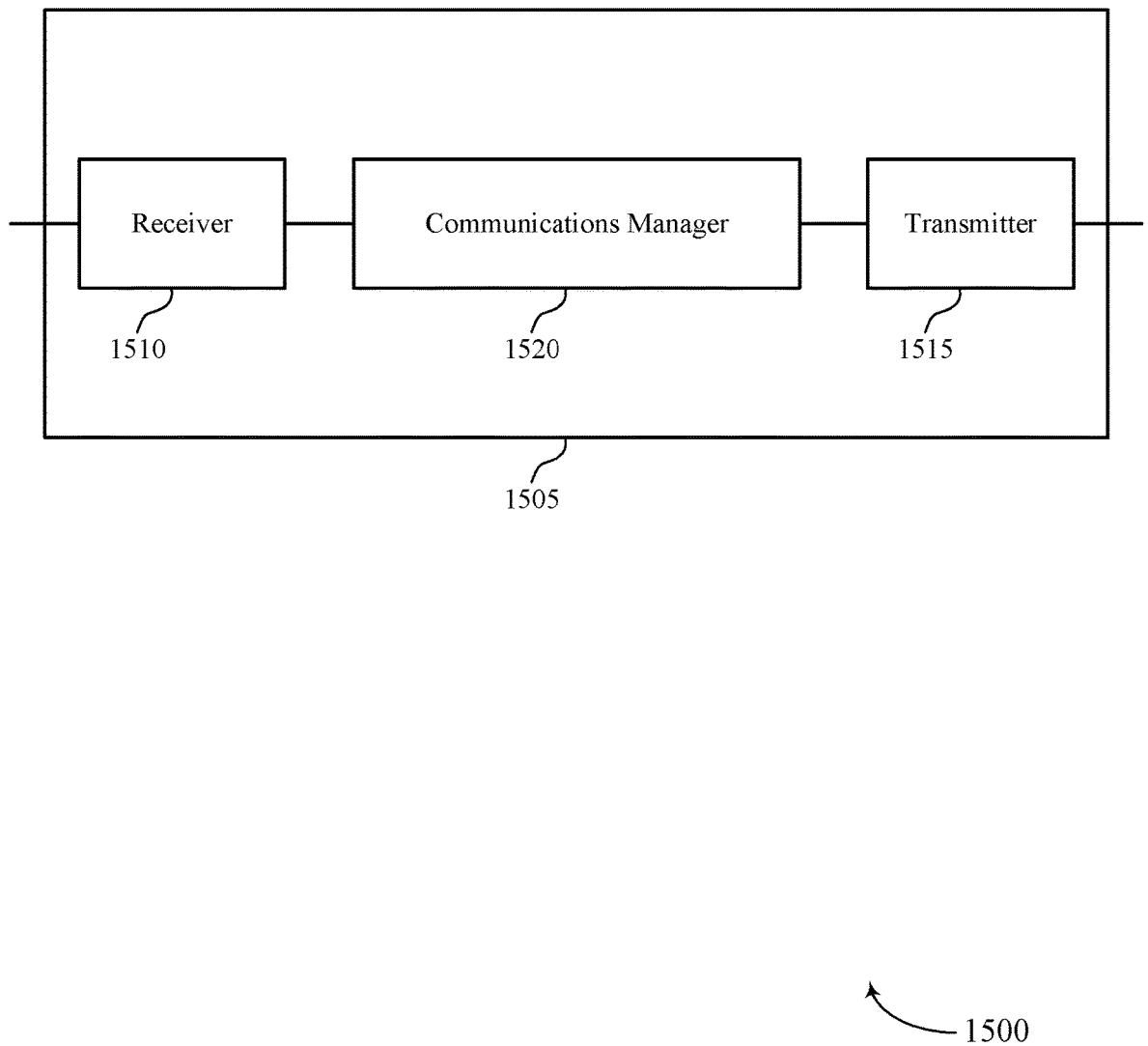
FIGS. 15 and 16 show diagrams of devices that support holographic-MIMO field type indication in accordance with aspects of the present disclosure.

FIG. 15 shows a diagram 1500 of a device 1505 that supports holographic-MIMO field type indication in accordance with aspects of the present disclosure. The device 1505 may be an example of aspects of a base station 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to holographic-MIMO field type indication). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to holographic-MIMO field type indication). In some examples, the transmitter 1515 may be co-located with a receiver 1510 in a transceiver module. The transmitter 1515 may utilize a single antenna or a set of multiple antennas.

The communications manager 1520, the receiver 1510, the transmitter 1515, or various combinations thereof or various components thereof may be examples of means for performing various aspects of holographic-MIMO field type indication as described herein. For example, the communications manager 1520, the receiver 1510, the transmitter 1515, or various combinations or components thereof may support a method for performing one or more of the functions described herein.

In some examples, the communications manager 1520, the receiver 1510, the transmitter 1515, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1520, the receiver 1510, the transmitter 1515, or various combinations or components thereof may be implemented in code (e.g., as communications management software or firmware) executed by a processor. If implemented in code executed by a processor, the functions of the communications manager 1520, the receiver 1510, the transmitter 1515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1520 may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communication at a base station in accordance with examples as disclosed herein. For example, the communications manager 1520 may be configured as or otherwise support a means for transmitting, to a UE, an indication of a field type of a field between the UE and the base station, the indication of the field type indicating to use one of a first set of beam weight vectors or a second set of beam weight vectors. The communications manager 1520 may be configured as or otherwise support a means for communicating a reference signal with the UE based on transmitting the indication of the field type that indicates one of the first set of beam weight vectors or the second set of beam weight vectors.

By including or configuring the communications manager 1520 in accordance with examples as described herein, the device 1505 (e.g., a processor controlling or otherwise coupled to the receiver 1510, the transmitter 1515, the communications manager 1520, or a combination thereof) may support techniques for device 1505 to enable another wireless device, such as a UE, to reduce a number of beams that the UE sweeps through during a beam sweep procedure (e.g., by providing the indication of the field type). Reducing the number of beams may reduce latency associated with performing the beam sweep procedure.

Figure 16:
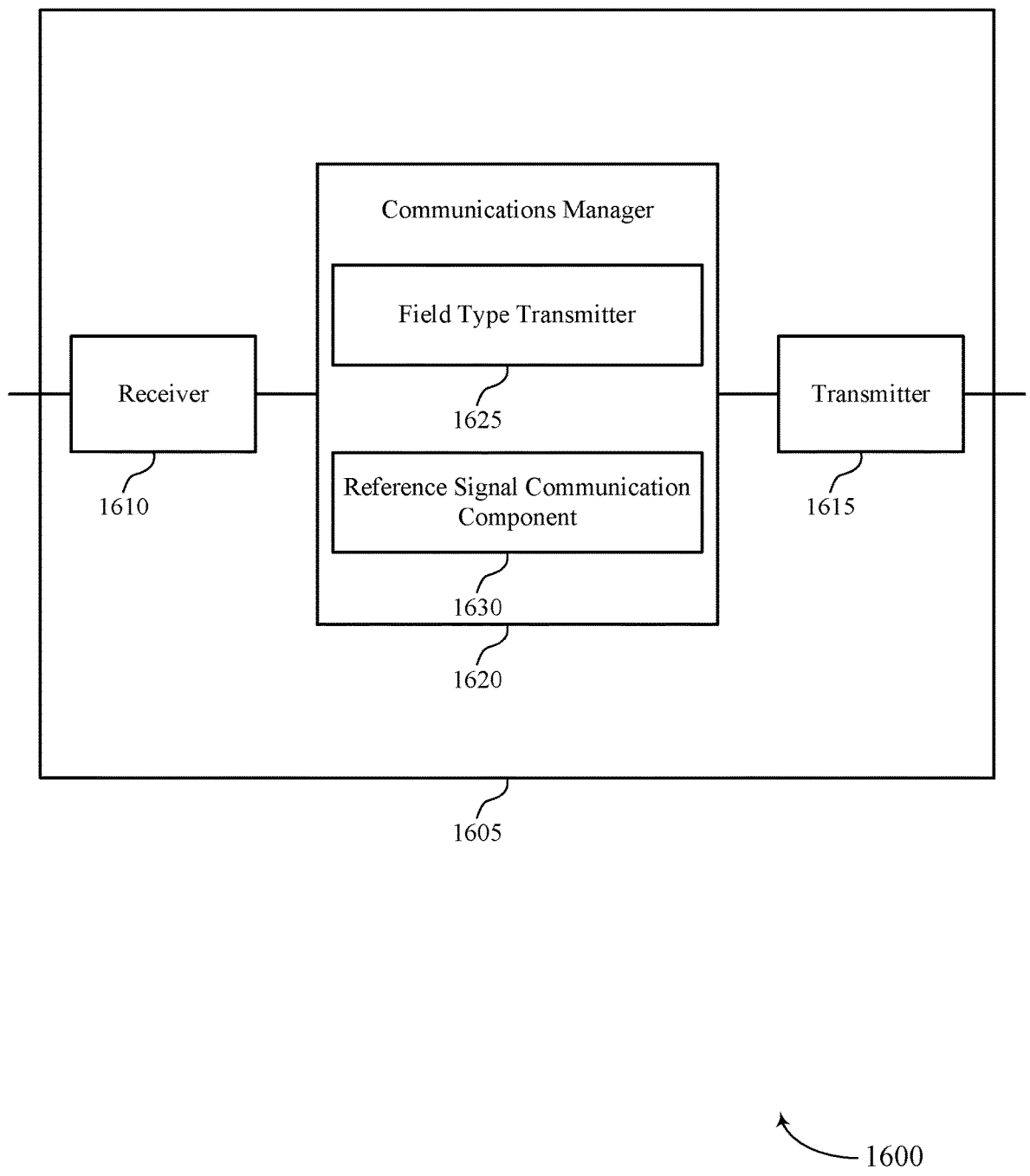

FIG. 16 shows a diagram 1600 of a device 1605 that supports holographic-MIMO field type indication in accordance with aspects of the present disclosure. The device 1605 may be an example of aspects of a device 1505 or a base station 105 as described herein. The device 1605 may include a receiver 1610, a transmitter 1615, and a communications manager 1620. The device 1605 may also include a processor. Each of these components may be in communication with one another (e.g., via one or more buses).

The receiver 1610 may provide a means for receiving information such as packets, user data, control information, or any combination thereof associated with various information channels (e.g., control channels, data channels, information channels related to holographic-MIMO field type indication). Information may be passed on to other components of the device 1605. The receiver 1610 may utilize a single antenna or a set of multiple antennas.

The transmitter 1615 may provide a means for transmitting signals generated by other components of the device 1605. For example, the transmitter 1615 may transmit information such as packets, user data, control information, or any combination thereof associated with various information channels (e.g., control channels, data channels, information channels related to holographic-MIMO field type indication). In some examples, the transmitter 1615 may be co-located with a receiver 1610 in a transceiver module. The transmitter 1615 may utilize a single antenna or a set of multiple antennas.

The device 1605, or various components thereof, may be an example of means for performing various aspects of holographic-MIMO field type indication as described herein. For example, the communications manager 1620 may include a field type transmitter 1625 a reference signal communication component 1630, or any combination thereof. The communications manager 1620 may be an example of aspects of a communications manager 1520 as described herein. In some examples, the communications manager 1620, or various components thereof, may be configured to perform various operations (e.g., receiving, monitoring, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to receive information, transmit information, or perform various other operations as described herein.

The communications manager 1620 may support wireless communication at a base station in accordance with examples as disclosed herein. The field type transmitter 1625 may be configured as or otherwise support a means for transmitting, to a UE, an indication of a field type of a field between the UE and the base station, the indication of the field type indicating to use one of a first set of beam weight vectors or a second set of beam weight vectors. The reference signal communication component 1630 may be configured as or otherwise support a means for communicating a reference signal with the UE based on transmitting the indication of the field type that indicates one of the first set of beam weight vectors or the second set of beam weight vectors.

Figure 17:
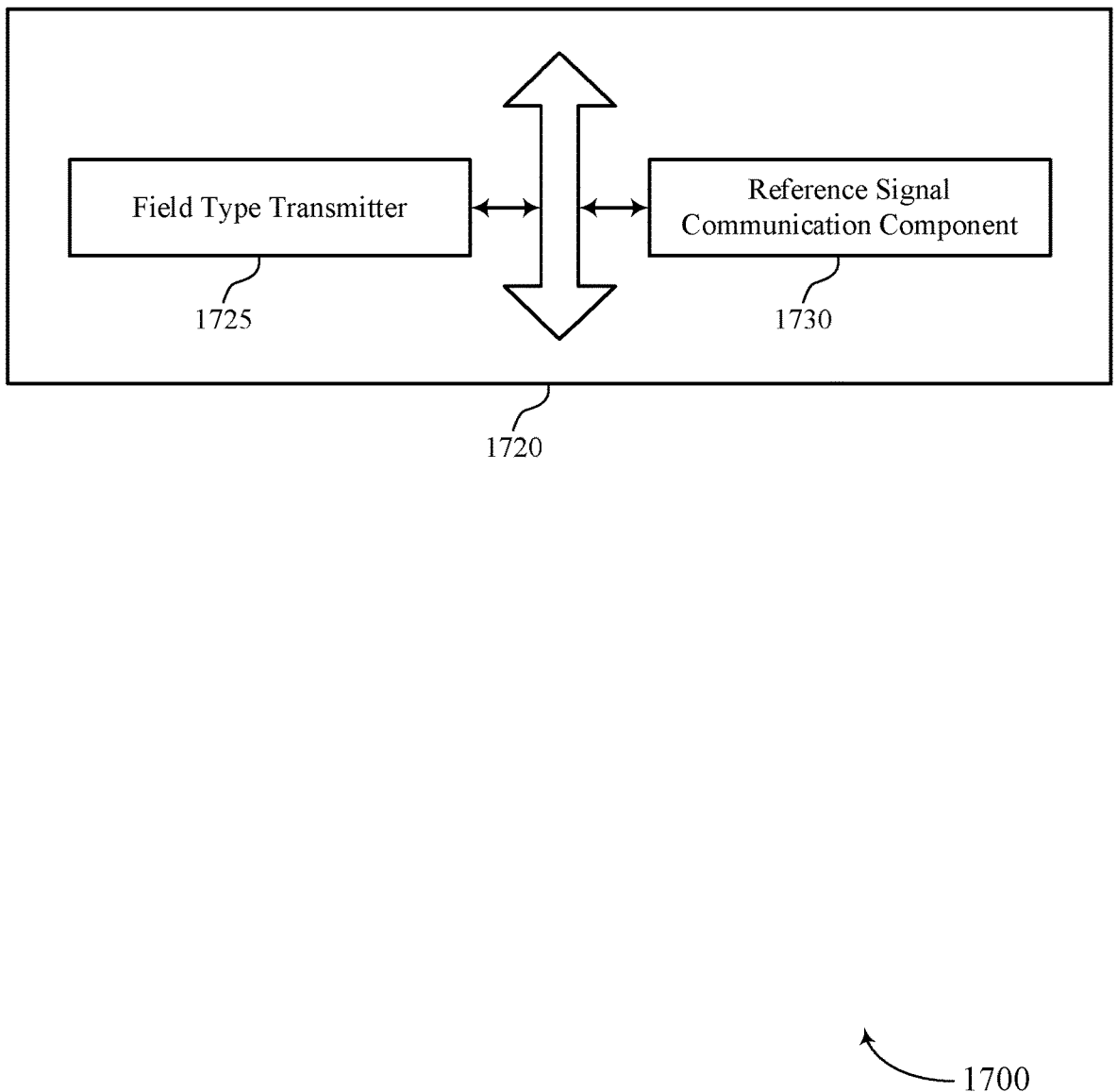
FIG. 17 shows a diagram of a communications manager that supports holographic-MIMO field type indication in accordance with aspects of the present disclosure.

FIG. 17 shows a diagram 1700 of a communications manager 1720 that supports holographic-MIMO field type indication in accordance with aspects of the present disclosure. The communications manager 1720 may be an example of aspects of a communications manager 1520, a communications manager 1620, or both, as described herein. The communications manager 1720, or various components thereof, may be an example of means for performing various aspects of holographic-MIMO field type indication as described herein. For example, the communications manager 1720 may include a field type transmitter 1725 a reference signal communication component 1730, or any combination thereof. Each of these components may communicate, directly or indirectly, with one another (e.g., via one or more buses).

The communications manager 1720 may support wireless communication at a base station in accordance with examples as disclosed herein. The field type transmitter 1725 may be configured as or otherwise support a means for transmitting, to a UE, an indication of a field type of a field between the UE and the base station, the indication of the field type indicating to use one of a first set of beam weight vectors or a second set of beam weight vectors. The reference signal communication component 1730 may be configured as or otherwise support a means for communicating a reference signal with the UE based on transmitting the indication of the field type that indicates one of the first set of beam weight vectors or the second set of beam weight vectors.

In some examples, to support transmitting the indication of the field type, the field type transmitter 1725 may be configured as or otherwise support a means for transmitting one or more bits indicating the field type, where each value of the one or more bits corresponds to a respective field type of a set of field types, and where communicating the reference signal is based on the one or more bits.

In some examples, to support transmitting the indication of the field type, the field type transmitter 1725 may be configured as or otherwise support a means for transmitting a measure indicating a likelihood that a field type includes a first field type as compared to a second field type, where communicating the reference signal is based on transmitting the measure indicating the likelihood.

In some examples, to support transmitting the indication of the field type, the field type transmitter 1725 may be configured as or otherwise support a means for transmitting an indication that the field type is the same as a second field type configured at the UE for a reference signal resource, where communicating the reference signal is based on transmitting the indication that the field type is the same as the second field type.

In some examples, to support communicating the reference signal, the reference signal communication component 1730 may be configured as or otherwise support a means for transmitting, to the UE, the reference signal that is a synchronization signal, a channel state information reference signal, or both.

In some examples, to support communicating the reference signal, the reference signal communication component 1730 may be configured as or otherwise support a means for receiving, from the UE, the reference signal that is a sounding reference signal using the beam.

In some examples, to support transmitting the indication of the field type, the field type transmitter 1725 may be configured as or otherwise support a means for transmitting the indication of the field type via radio resource control signaling, medium access control (MAC) control element (MAC-CE) signaling, downlink control information signaling, uplink control information signaling, sidelink control information signaling, or any combination thereof.

In some examples, the first set of beam weight vectors is associated with a first codebook for two-dimensional beams and the second set of beam weight vectors is associated with a second codebook for three-dimensional beams. In some examples, to support transmitting the indication of the field type, the field type transmitter 1725 may be configured as or otherwise support a means for transmitting the indication of the field type that indicates to select one of the first codebook or the second codebook, where communicating the reference signal is based on transmitting the indication of the field type that indicates to select the one of the first codebook or the second codebook.

In some examples, the indication of the field type is for one of a control channel or a data channel, and the field type transmitter 1725 may be configured as or otherwise support a means for transmitting, to the UE, an indication of a second field type for the other of the control channel or the data channel.

In some examples, the indication of the field type is for the beam of a channel, and the field type transmitter 1725 may be configured as or otherwise support a means for transmitting, to the UE, an indication of a second field type for a second beam of the channel.

In some examples, the field type includes an indication that the UE is in a near-field relative to the base station or that the UE is in a far-field relative to the base station.

Figure 18:
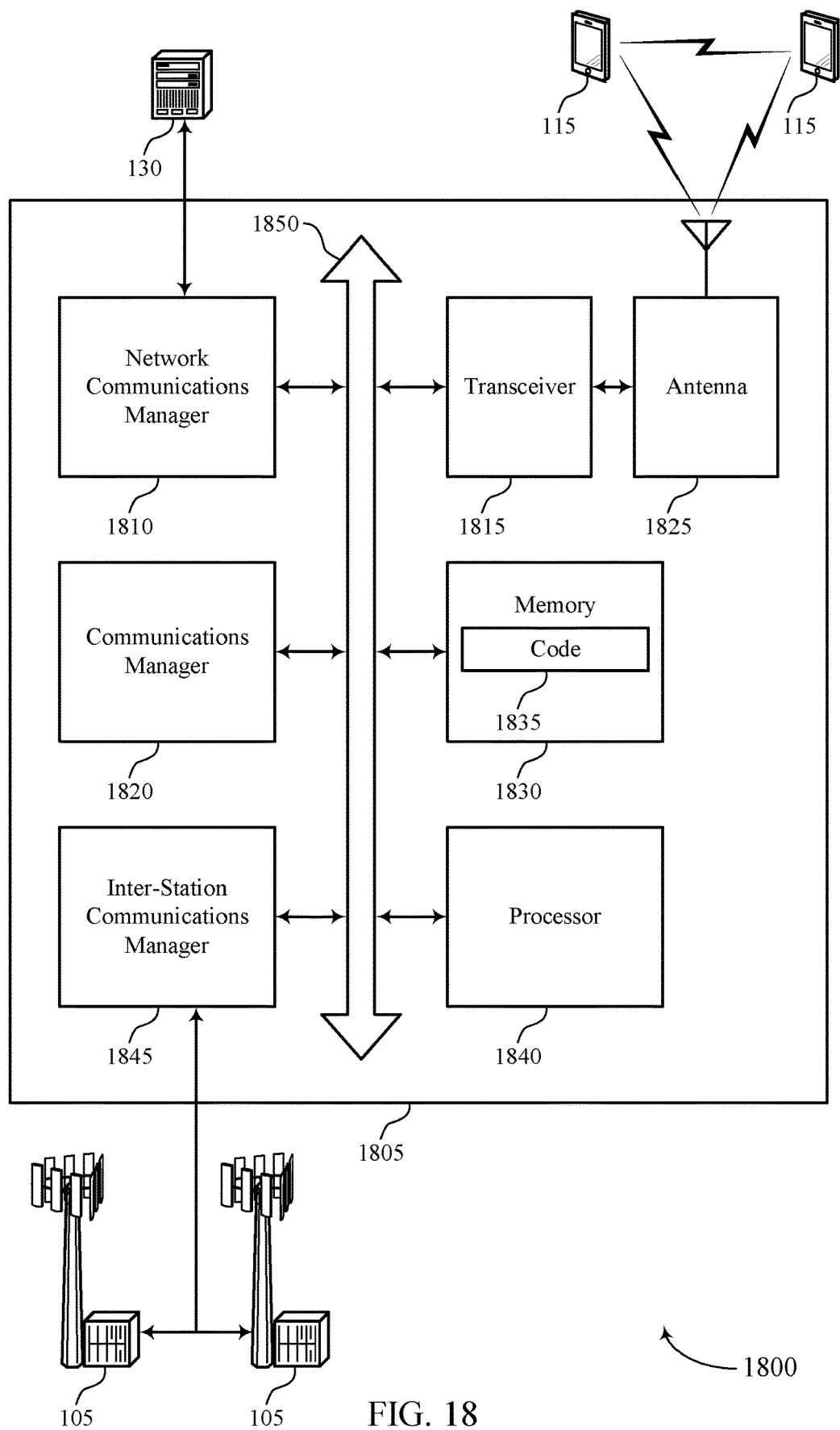
FIG. 18 shows a diagram of a system including a device that supports holographic-MIMO field type indication in accordance with aspects of the present disclosure.

FIG. 18 shows a diagram of a system 1800 including a device 1805 that supports holographic-MIMO field type indication in accordance with aspects of the present disclosure. The device 1805 may be an example of or include the components of a device 1505, a device 1605, or a base station 105 as described herein. The device 1805 may communicate wirelessly with one or more base stations 105, UEs 115, or any combination thereof. The device 1805 may include components for bi-directional voice and data communications including components for transmitting and receiving communications, such as a communications manager 1820, a network communications manager 1810, a transceiver 1815, an antenna 1825, a memory 1830, code 1835, a processor 1840, and an inter-station communications manager 1845. These components may be in electronic communication or otherwise coupled (e.g., operatively, communicatively, functionally, electronically, electrically) via one or more buses (e.g., a bus 1850).

The network communications manager 1810 may manage communications with a core network 130 (e.g., via one or more wired backhaul links). For example, the network communications manager 1810 may manage the transfer of data communications for client devices, such as one or more UEs 115.

In some cases, the device 1805 may include a single antenna 1825. However, in some other cases the device 1805 may have more than one antenna 1825, which may be capable of concurrently transmitting or receiving multiple wireless transmissions. The transceiver 1815 may communicate bi-directionally, via the one or more antennas 1825, wired, or wireless links as described herein. For example, the transceiver 1815 may represent a wireless transceiver and may communicate bi-directionally with another wireless transceiver. The transceiver 1815 may also include a modem to modulate the packets, to provide the modulated packets to one or more antennas 1825 for transmission, and to demodulate packets received from the one or more antennas 1825. The transceiver 1815, or the transceiver 1815 and one or more antennas 1825, may be an example of a transmitter 1515, a transmitter 1615, a receiver 1510, a receiver 1610, or any combination thereof or component thereof, as described herein.

The memory 1830 may include RAM and ROM. The memory 1830 may store computer-readable, computer-executable code 1835 including instructions that, when executed by the processor 1840, cause the device 1805 to perform various functions described herein. The code 1835 may be stored in a non-transitory computer-readable medium such as system memory or another type of memory. In some cases, the code 1835 may not be directly executable by the processor 1840 but may cause a computer (e.g., when compiled and executed) to perform functions described herein. In some cases, the memory 1830 may contain, among other things, a BIOS which may control basic hardware or software operation such as the interaction with peripheral components or devices.

The processor 1840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some other cases, a memory controller may be integrated into the processor 1840. The processor 1840 may be configured to execute computer-readable instructions stored in a memory (e.g., the memory 1830) to cause the device 1805 to perform various functions (e.g., functions or tasks supporting holographic-MIMO field type indication). For example, the device 1805 or a component of the device 1805 may include a processor 1840 and memory 1830 coupled to the processor 1840, the processor 1840 and memory 1830 configured to perform various functions described herein.

The inter-station communications manager 1845 may manage communications with other base stations 105, and may include a controller or scheduler for controlling communications with UEs 115 in cooperation with other base stations 105. For example, the inter-station communications manager 1845 may coordinate scheduling for transmissions to UEs 115 for various interference mitigation techniques such as beamforming or joint transmission. In some examples, the inter-station communications manager 1845 may provide an X2 interface within an LTE/LTE-A wireless communications network technology to provide communication between base stations 105.

The communications manager 1820 may support wireless communication at a base station in accordance with examples as disclosed herein. For example, the communications manager 1820 may be configured as or otherwise support a means for transmitting, to a UE, an indication of a field type of a field between the UE and the base station, the indication of the field type indicating to use one of a first set of beam weight vectors or a second set of beam weight vectors. The communications manager 1820 may be configured as or otherwise support a means for communicating a reference signal with the UE based on transmitting the indication of the field type that indicates one of the first set of beam weight vectors or the second set of beam weight vectors.

By including or configuring the communications manager 1820 in accordance with examples as described herein, the device 1805 may support techniques for device 1805 to enable another wireless device, such as a UE, to reduce a number of beams that the UE sweeps through during a beam sweep procedure (e.g., by providing the indication of the field type). Reducing the number of beams may reduce latency associated with performing the beam sweep procedure.

In some examples, the communications manager 1820 may be configured to perform various operations (e.g., receiving, monitoring, transmitting) using or otherwise in cooperation with the transceiver 1815, the one or more antennas 1825, or any combination thereof. Although the communications manager 1820 is illustrated as a separate component, in some examples, one or more functions described with reference to the communications manager 1820 may be supported by or performed by the processor 1840, the memory 1830, the code 1835, or any combination thereof. For example, the code 1835 may include instructions executable by the processor 1840 to cause the device 1805 to perform various aspects of holographic-MIMO field type indication as described herein, or the processor 1840 and the memory 1830 may be otherwise configured to perform or support such operations.

Figure 19:
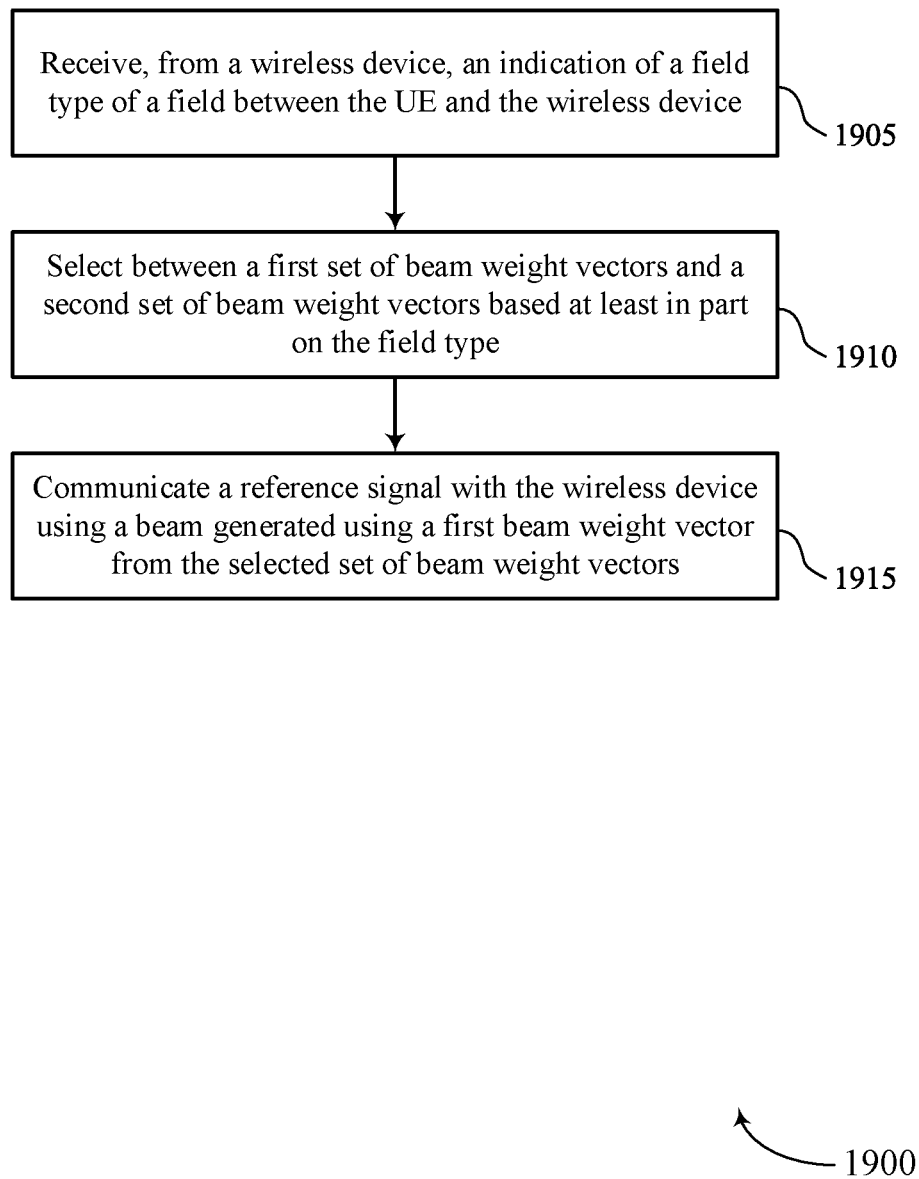
FIGS. 19 through 24 show flowcharts illustrating methods that support holographic-MIMO field type indication in accordance with aspects of the present disclosure.

FIG. 19 shows a flowchart illustrating a method 1900 that supports holographic-MIMO field type indication in accordance with aspects of the present disclosure. The operations of the method 1900 may be implemented by a UE or its components as described herein. For example, the operations of the method 1900 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 1905, the method may include receiving, from a wireless device, an indication of a field type of a field between the UE and the wireless device. The operations of 1905 may be performed in accordance with examples as disclosed herein. In some examples, aspects of the operations of 1905 may be performed by a field type indication receiver 1325 as described with reference to FIG. 13.

At 1910, the method may include selecting between a first set of beam weight vectors and a second set of beam weight vectors based on the field type. The operations of 1910 may be performed in accordance with examples as disclosed herein. In some examples, aspects of the operations of 1910 may be performed by a beam weight vector selector 1330 as described with reference to FIG. 13.

At 1915, the method may include communicating a reference signal with the wireless device using a beam generated using a first beam weight vector from the selected set of beam weight vectors. The operations of 1915 may be performed in accordance with examples as disclosed herein. In some examples, aspects of the operations of 1915 may be performed by a reference signal communication component 1335 as described with reference to FIG. 13.

Figure 20:
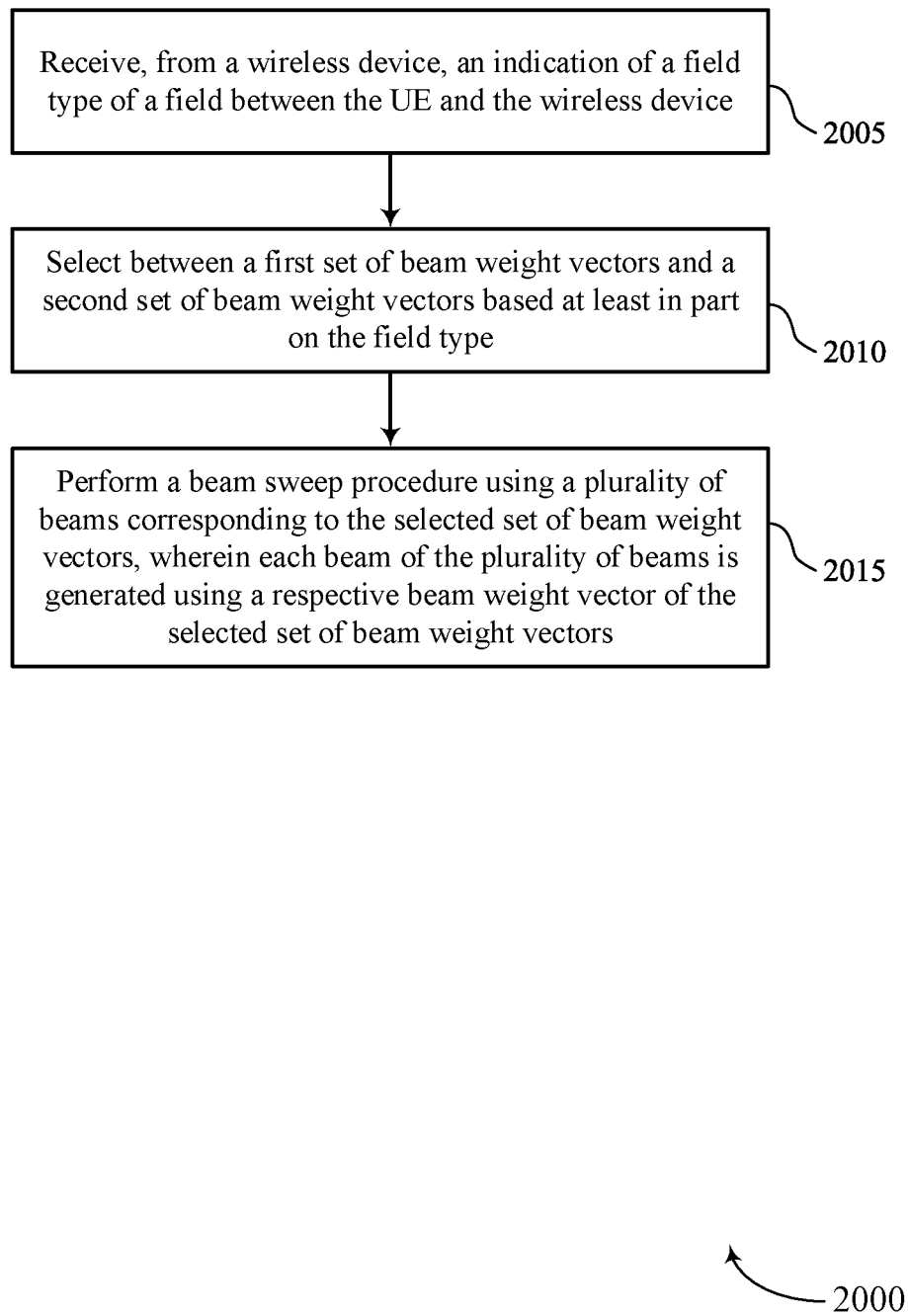

FIG. 20 shows a flowchart illustrating a method 2000 that supports holographic-MIMO field type indication in accordance with aspects of the present disclosure. The operations of the method 2000 may be implemented by a UE or its components as described herein. For example, the operations of the method 2000 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 2005, the method may include receiving, from a wireless device, an indication of a field type of a field between the UE and the wireless device. The operations of 2005 may be performed in accordance with examples as disclosed herein. In some examples, aspects of the operations of 2005 may be performed by a field type indication receiver 1325 as described with reference to FIG. 13.

At 2010, the method may include selecting between a first set of beam weight vectors and a second set of beam weight vectors based on the field type. The operations of 2010 may be performed in accordance with examples as disclosed herein. In some examples, aspects of the operations of 2010 may be performed by a beam weight vector selector 1330 as described with reference to FIG. 13.

At 2015, the method may include performing a beam sweep procedure using a set of multiple beams corresponding to the selected set of beam weight vectors, where each beam of the set of multiple beams is generated using a respective beam weight vector of the selected set of beam weight vectors. The operations of 2015 may be performed in accordance with examples as disclosed herein. In some examples, aspects of the operations of 2015 may be performed by a reference signal communication component 1335 as described with reference to FIG. 13.

Figure 21:
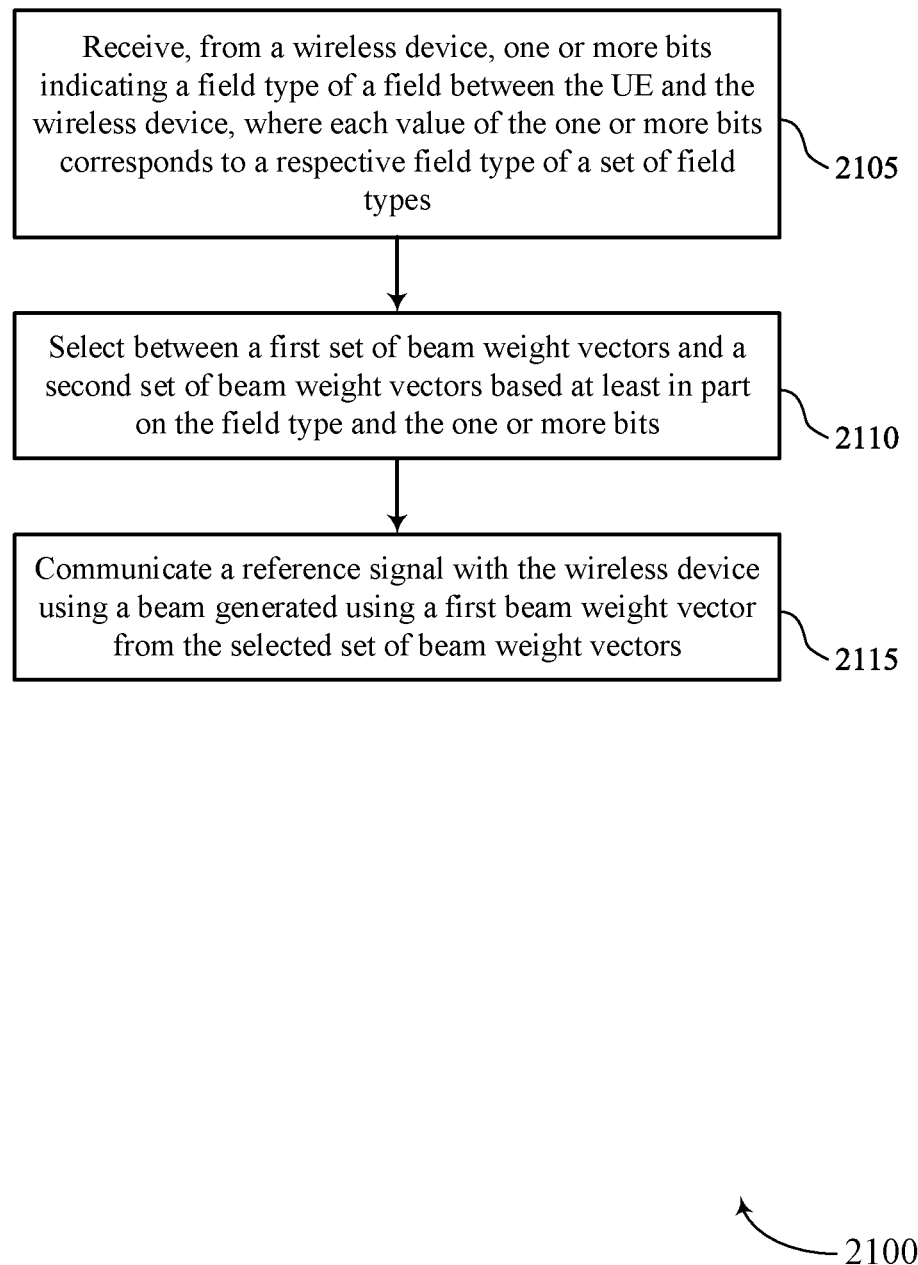

FIG. 21 shows a flowchart illustrating a method 2100 that supports holographic-MIMO field type indication in accordance with aspects of the present disclosure. The operations of the method 2100 may be implemented by a UE or its components as described herein. For example, the operations of the method 2100 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 2105, the method may include receiving, from a wireless device, one or more bits indicating a field type of a field between the UE and the wireless device, where each value of the one or more bits corresponds to a respective field type of a set of field types. In some examples, aspects of the operations of 2105 may be performed by a field type indication receiver 1325 as described with reference to FIG. 13.

At 2110, the method may include selecting between a first set of beam weight vectors and a second set of beam weight vectors based at least in part on the field type and the one or more bits. The operations of 2110 may be performed in accordance with examples as disclosed herein. In some examples, aspects of the operations of 2110 may be performed by a beam weight vector selector 1330 as described with reference to FIG. 13.

At 2115, the method may include communicating a reference signal with the wireless device using a beam generated using a first beam weight vector from the selected set of beam weight vectors. The operations of 2115 may be performed in accordance with examples as disclosed herein. In some examples, aspects of the operations of 2115 may be performed by a reference signal communication component 1335 as described with reference to FIG. 13.

Figure 22:
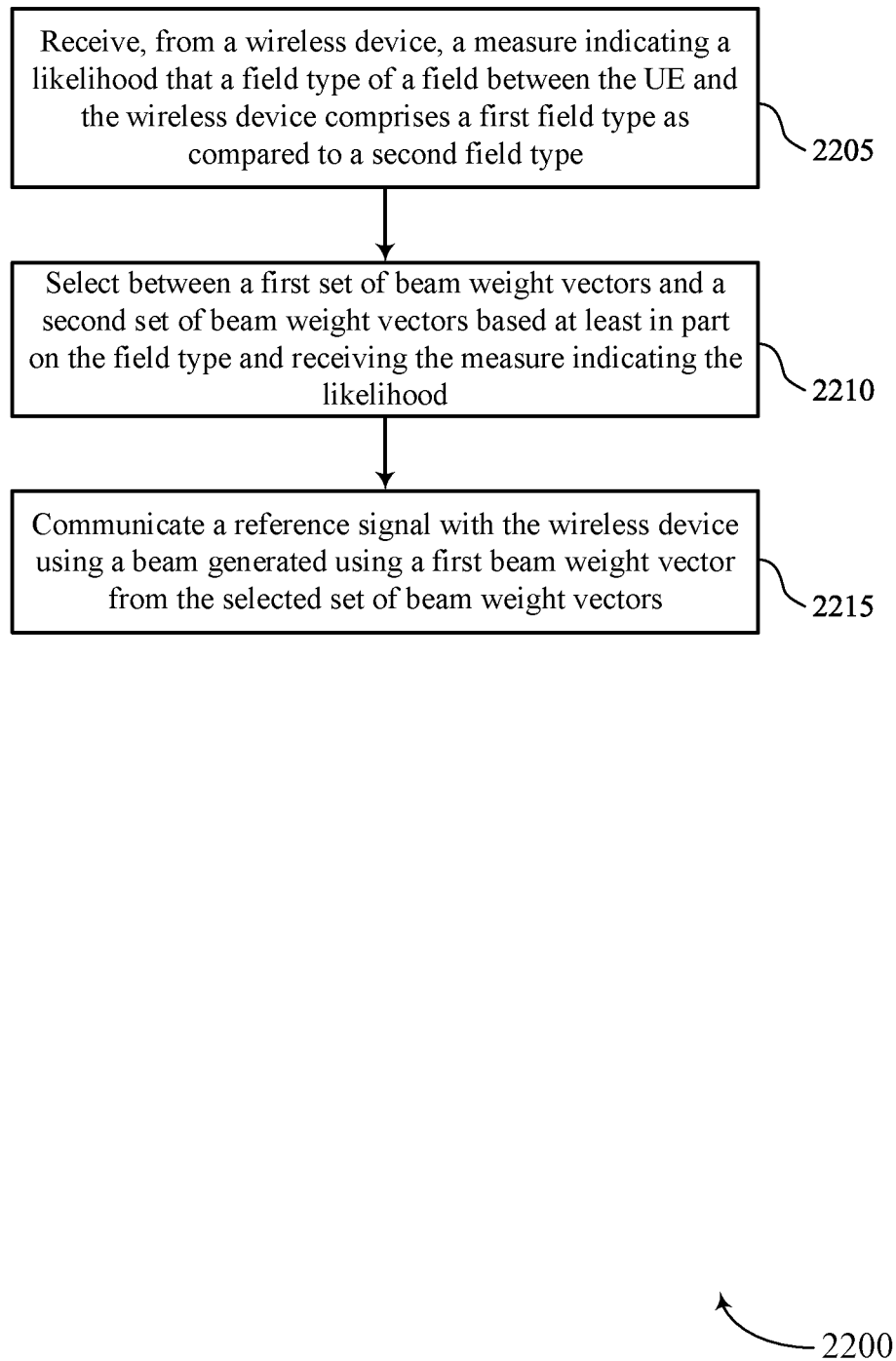

FIG. 22 shows a flowchart illustrating a method 2200 that supports holographic-MIMO field type indication in accordance with aspects of the present disclosure. The operations of the method 2200 may be implemented by a UE or its components as described herein. For example, the operations of the method 2200 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 2205, the method may include receiving, from a wireless device, a measure indicating a likelihood that a field type of a field between the UE and the wireless device comprises a first field type as compared to a second field type. The operations of 2205 may be performed in accordance with examples as disclosed herein. In some examples, aspects of the operations of 2205 may be performed by a field type indication receiver 1325 as described with reference to FIG. 13.

At 2210, the method may include selecting between a first set of beam weight vectors and a second set of beam weight vectors based at least in part on the field type and receiving the measure indicating the likelihood. The operations of 2210 may be performed in accordance with examples as disclosed herein. In some examples, aspects of the operations of 2210 may be performed by a beam weight vector selector 1330 as described with reference to FIG. 13.

At 2215, the method may include communicating a reference signal with the wireless device using a beam generated using a first beam weight vector from the selected set of beam weight vectors. The operations of 2215 may be performed in accordance with examples as disclosed herein. In some examples, aspects of the operations of 2215 may be performed by a reference signal communication component 1335 as described with reference to FIG. 13.

Figure 23:
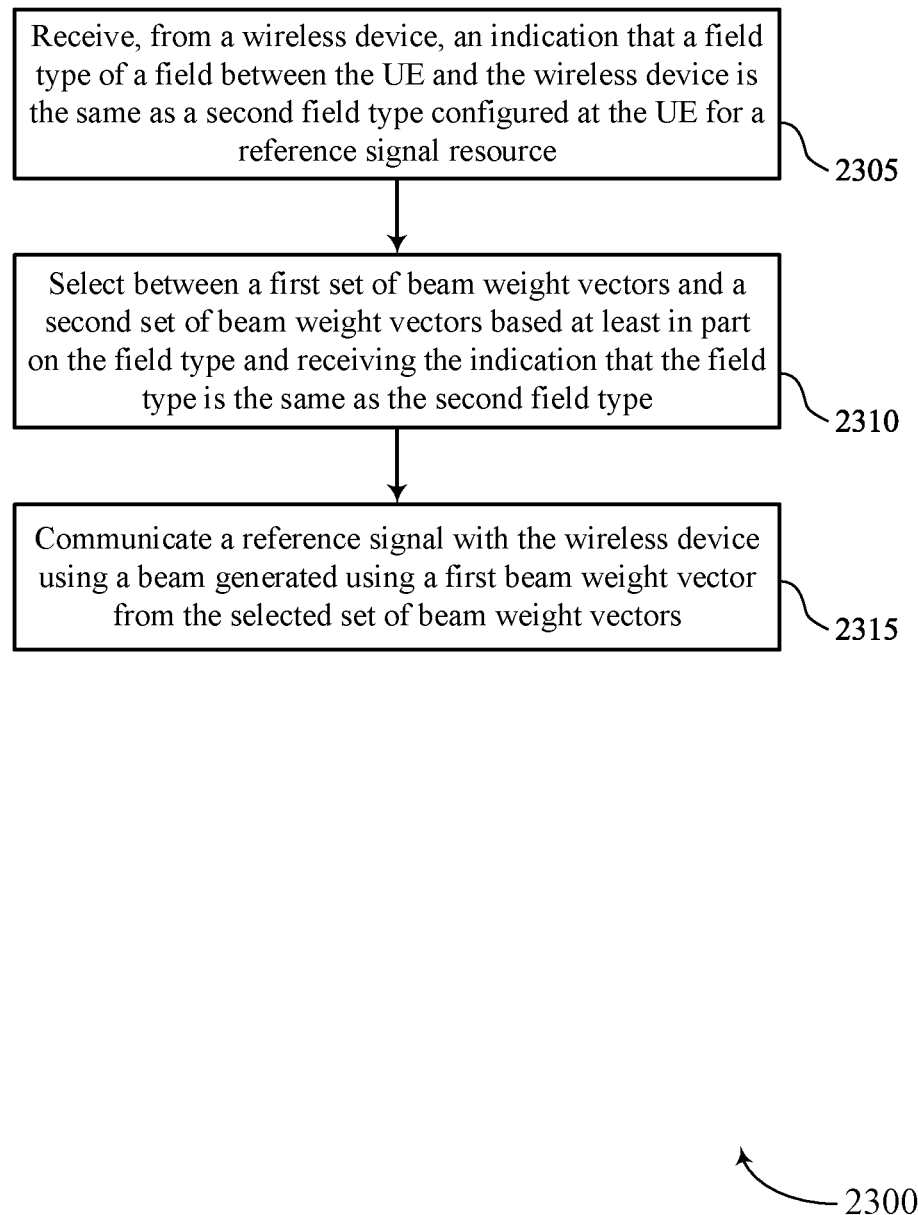

FIG. 23 shows a flowchart illustrating a method 2300 that supports holographic-MIMO field type indication in accordance with aspects of the present disclosure. The operations of the method 2300 may be implemented by a UE or its components as described herein. For example, the operations of the method 2300 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 2305, the method may include receiving, from a wireless device, an indication that a field type of a field between the UE and the wireless device is the same as a second field type configured at the UE for a reference signal resource. The operations of 2305 may be performed in accordance with examples as disclosed herein. In some examples, aspects of the operations of 2305 may be performed by a field type indication receiver 1325 as described with reference to FIG. 13.

At 2310, the method may include selecting between a first set of beam weight vectors and a second set of beam weight vectors based at least in part on the field type and receiving the indication that the field type is the same as the second field type. The operations of 2310 may be performed in accordance with examples as disclosed herein. In some examples, aspects of the operations of 2310 may be performed by a beam weight vector selector 1330 as described with reference to FIG. 13.

At 2315, the method may include communicating a reference signal with the wireless device using a beam generated using a first beam weight vector from the selected set of beam weight vectors. The operations of 2315 may be performed in accordance with examples as disclosed herein. In some examples, aspects of the operations of 2315 may be performed by a reference signal communication component 1335 as described with reference to FIG. 13.

Figure 24:
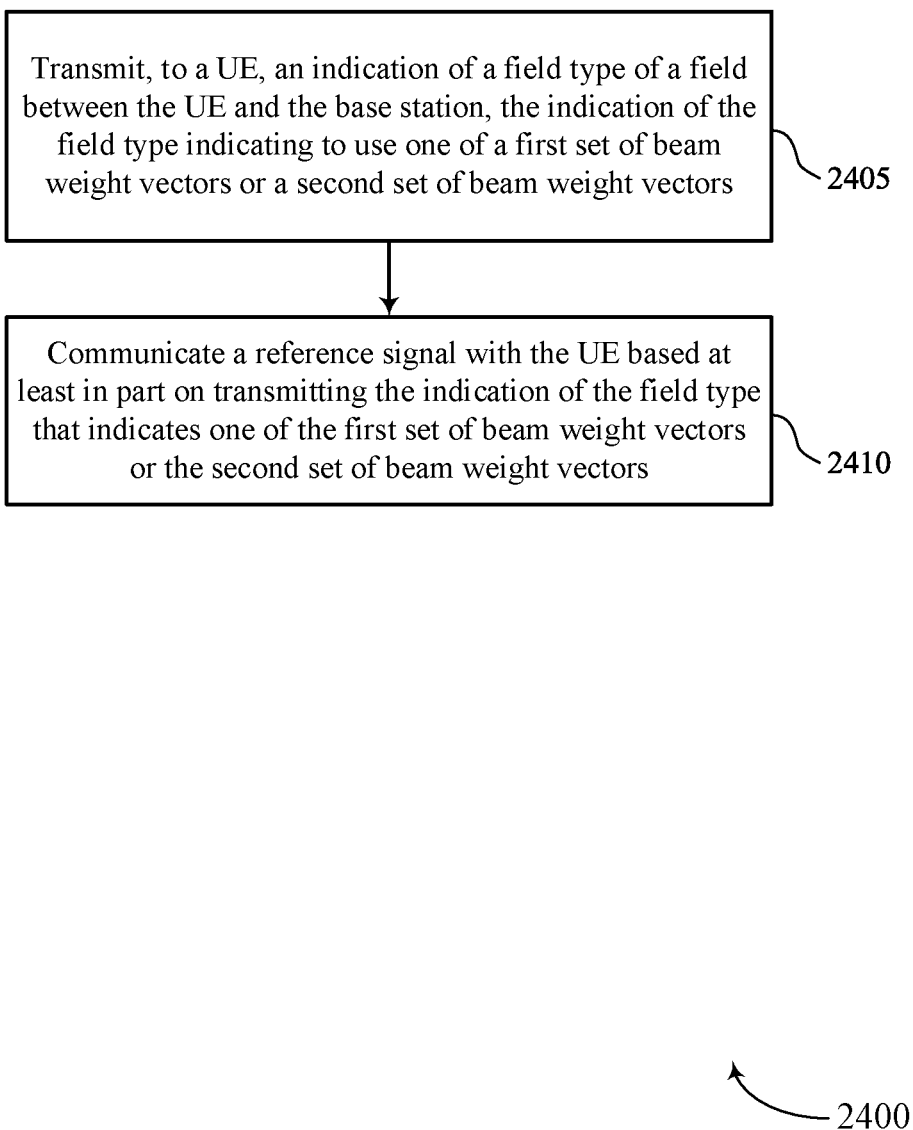

FIG. 24 shows a flowchart illustrating a method 2400 that supports holographic-MIMO field type indication in accordance with aspects of the present disclosure. The operations of the method 2400 may be implemented by a base station or its components as described herein. For example, the operations of the method 2400 may be performed by a base station 105 as described with reference to FIGS. 1 through 10 and 15 through 18. In some examples, a base station may execute a set of instructions to control the functional elements of the base station to perform the described functions. Additionally or alternatively, the base station may perform aspects of the described functions using special-purpose hardware.

At 2405, the method may include transmitting, to a UE, an indication of a field type of a field between the UE and the base station, the indication of the field type indicating to use one of a first set of beam weight vectors or a second set of beam weight vectors. The operations of 2405 may be performed in accordance with examples as disclosed herein. In some examples, aspects of the operations of 2405 may be performed by a field type transmitter 1725 as described with reference to FIG. 17.

At 2410, the method may include communicating a reference signal with the UE based on transmitting the indication of the field type that indicates one of the first set of beam weight vectors or the second set of beam weight vectors. The operations of 2410 may be performed in accordance with examples as disclosed herein. In some examples, aspects of the operations of 2410 may be performed by a reference signal communication component 1730 as described with reference to FIG. 17.

The following provides an overview of aspects of the present disclosure:

Aspect 1: A method for wireless communication at a UE, comprising: receiving, from a wireless device, an indication of a field type of a field between the UE and the wireless device; selecting between a first set of beam weight vectors and a second set of beam weight vectors based at least in part on the field type; and communicating a reference signal with the wireless device using a beam generated using a first beam weight vector from the selected set of beam weight vectors.

Aspect 2: The method of aspect 1, wherein communicating the reference signal comprises: performing a beam sweep procedure using a plurality of beams corresponding to the selected set of beam weight vectors, wherein each beam of the plurality of beams is generated using a respective beam weight vector of the selected set of beam weight vectors.

Aspect 3: The method of any of aspects 1 through 2, wherein receiving the indication of the field type comprises: receiving one or more bits indicating the field type, wherein each value of the one or more bits corresponds to a respective field type of a set of field types, and wherein selecting between the first set of beam weight vectors and the second set of beam weight vectors is based at least in part on the one or more bits.

Aspect 4: The method of any of aspects 1 through 3, wherein receiving the indication of the field type comprises: receiving a measure indicating a likelihood that the field type comprises a first field type as compared to a second field type, wherein selecting between the first set of beam weight vectors and the second set of beam weight vectors is based at least in part on receiving the measure indicating the likelihood.

Aspect 5: The method of any of aspects 1 through 4, wherein receiving the indication of the field type comprises: receiving an indication that the field type is the same as a second field type configured at the UE for a reference signal resource, wherein selecting between the first set of beam weight vectors and the second set of beam weight vectors is based at least in part on receiving the indication that the field type is the same as the second field type.

Aspect 6: The method of any of aspects 1 through 5, wherein the first set of beam weight vectors is associated with a first codebook for two-dimensional beams and the second set of beam weight vectors is associated with a second codebook for three-dimensional beams, wherein receiving the indication of the field type comprises: receiving the indication of the field type that indicates to select one of the first codebook or the second codebook, wherein selecting between the first set of beam weight vectors and the second set of beam weight vectors comprises selecting between the first codebook or the second codebook based at least in part on the indication of the field type, and wherein communicating the reference signal comprises performing a beam sweep procedure using one or more beams generated using the selected codebook.

Aspect 7: The method of any of aspects 1 through 6, wherein communicating the reference signal comprises: receiving, from the wireless device, the reference signal that is a synchronization signal, a channel state information reference signal, or both, using the beam.

Aspect 8: The method of any of aspects 1 through 7, wherein communicating the reference signal comprises: transmitting, to the wireless device, the reference signal that is a sounding reference signal using the beam.

Aspect 9: The method of any of aspects 1 through 8, wherein receiving the indication of the field type comprises: receiving the indication of the field type via radio resource control signaling, medium access control (MAC) control element (MAC-CE) signaling, downlink control information signaling, uplink control information signaling, sidelink control information signaling, or any combination thereof.

Aspect 10: The method of any of aspects 1 through 9, wherein the wireless device comprises a first transmission reception point, the method further comprising: receiving, during a time when the UE is configured to communicate with the first transmission reception point, an indication of a field type between the UE and a second transmission reception point.

Aspect 11: The method of any of aspects 1 through 10, wherein the indication of the field type is for one of a control channel or a data channel, the method further comprising: receiving, from the wireless device, an indication of a second field type for the other of the control channel or the data channel.

Aspect 12: The method of any of aspects 1 through 11, wherein the indication of the field type is for the beam of a channel, the method further comprising: receiving, from the wireless device, an indication of a second field type for a second beam of the channel.

Aspect 13: The method of any of aspects 1 through 12, wherein the field type comprises an indication that the UE is in a near-field relative to the wireless device or that the UE is in a far-field relative to the wireless device.

Aspect 14: A method for wireless communication at a base station, comprising: transmitting, to a UE, an indication of a field type of a field between the UE and the base station, the indication of the field type indicating to use one of a first set of beam weight vectors or a second set of beam weight vectors; and communicating a reference signal with the UE based at least in part on transmitting the indication of the field type that indicates one of the first set of beam weight vectors or the second set of beam weight vectors.

Aspect 15: The method of aspect 14, wherein transmitting the indication of the field type comprises: transmitting one or more bits indicating the field type, wherein each value of the one or more bits corresponds to a respective field type of a set of field types, and wherein communicating the reference signal is based at least in part on the one or more bits.

Aspect 16: The method of any of aspects 14 through 15, wherein transmitting the indication of the field type comprises: transmitting a measure indicating a likelihood that the field type comprises a first field type as compared to a second field type, wherein communicating the reference signal is based at least in part on transmitting the measure indicating the likelihood.

Aspect 17: The method of any of aspects 14 through 16, wherein transmitting the indication of the field type comprises: transmitting an indication that the field type is the same as a second field type configured at the UE for a reference signal resource, wherein communicating the reference signal is based at least in part on transmitting the indication that the field type is the same as the second field type.

Aspect 18: The method of any of aspects 14 through 17, wherein communicating the reference signal comprises: transmitting, to the UE, the reference signal that is a synchronization signal, a channel state information reference signal, or both.

Aspect 19: The method of any of aspects 14 through 18, wherein communicating the reference signal comprises: receiving, from the UE, the reference signal that is a sounding reference signal.

Aspect 20: The method of any of aspects 14 through 19, wherein transmitting the indication of the field type comprises: transmitting the indication of the field type via radio resource control signaling, medium access control (MAC) control element (MAC-CE) signaling, downlink control information signaling, uplink control information signaling, sidelink control information signaling, or any combination thereof.

Aspect 21: The method of any of aspects 14 through 20, wherein the first set of beam weight vectors is associated with a first codebook for two-dimensional beams and the second set of beam weight vectors is associated with a second codebook for three-dimensional beams, wherein transmitting the indication of the field type comprises: transmitting the indication of the field type that indicates to select one of the first codebook or the second codebook, wherein communicating the reference signal is based at least in part on transmitting the indication of the field type that indicates to select the one of the first codebook or the second codebook.

Aspect 22: The method of any of aspects 14 through 21, wherein the indication of the field type is for one of a control channel or a data channel, the method further comprising: transmitting, to the UE, an indication of a second field type for the other of the control channel or the data channel.

Aspect 23: The method of any of aspects 14 through 22, wherein the indication of the field type is for a beam of a channel, the method further comprising: transmitting, to the UE, an indication of a second field type for a second beam of the channel.

Aspect 24: The method of any of aspects 14 through 23, wherein the field type comprises an indication that the UE is in a near-field relative to the base station or that the UE is in a far-field relative to the base station.

Aspect 25: An apparatus for wireless communication at a UE, comprising a processor; memory coupled with the processor; and instructions stored in the memory and executable by the processor to cause the apparatus to perform a method of any of aspects 1 through 13.

Aspect 26: An apparatus for wireless communication at a UE, comprising at least one means for performing a method of any of aspects 1 through 13.

Aspect 27: A non-transitory computer-readable medium storing code for wireless communication at a UE, the code comprising instructions executable by a processor to perform a method of any of aspects 1 through 13.

Aspect 28: An apparatus for wireless communication at a base station, comprising a processor; memory coupled with the processor; and instructions stored in the memory and executable by the processor to cause the apparatus to perform a method of any of aspects 14 through 24.

Aspect 29: An apparatus for wireless communication at a base station, comprising at least one means for performing a method of any of aspects 14 through 24.

Aspect 30: A non-transitory computer-readable medium storing code for wireless communication at a base station, the code comprising instructions executable by a processor to perform a method of any of aspects 14 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
  receiving, from a wireless device, an indication of a field type of a field between the UE and the wireless device;
  selecting between a first set of beam weight vectors and a second set of beam weight vectors based at least in part on the field type; and
  communicating a reference signal with the wireless device using a beam generated using a first beam weight vector from the selected set of beam weight vectors.

2. The method of claim 1, wherein communicating the reference signal comprises:
  performing a beam sweep procedure using a plurality of beams corresponding to the selected set of beam weight vectors, wherein each beam of the plurality of beams is generated using a respective beam weight vector of the selected set of beam weight vectors.

3. The method of claim 1, wherein receiving the indication of the field type comprises:
  receiving one or more bits indicating the field type, wherein each value of the one or more bits corresponds to a respective field type of a set of field types, and wherein selecting between the first set of beam weight vectors and the second set of beam weight vectors is based at least in part on the one or more bits.

4. The method of claim 1, wherein receiving the indication of the field type comprises:
  receiving a measure indicating a likelihood that the field type comprises a first field type as compared to a second field type, wherein selecting between the first set of beam weight vectors and the second set of beam weight vectors is based at least in part on receiving the measure indicating the likelihood.

5. The method of claim 1, wherein receiving the indication of the field type comprises:
  receiving an indication that the field type is the same as a second field type configured at the UE for a reference signal resource, wherein selecting between the first set of beam weight vectors and the second set of beam weight vectors is based at least in part on receiving the indication that the field type is the same as the second field type.

6. The method of claim 1, wherein the first set of beam weight vectors is associated with a first codebook for two-dimensional beams and the second set of beam weight vectors is associated with a second codebook for three-dimensional beams, wherein receiving the indication of the field type comprises:
  receiving the indication of the field type that indicates to select one of the first codebook or the second codebook, wherein selecting between the first set of beam weight vectors and the second set of beam weight vectors comprises selecting between the first codebook or the second codebook based at least in part on the indication of the field type, and wherein communicating the reference signal comprises performing a beam sweep procedure using one or more beams generated using the selected codebook.

7. The method of claim 1, wherein communicating the reference signal comprises:
  receiving, from the wireless device, the reference signal that is a synchronization signal, a channel state information reference signal, or both, using the beam.

8. The method of claim 1, wherein communicating the reference signal comprises:
  transmitting, to the wireless device, the reference signal that is a sounding reference signal using the beam.

9. The method of claim 1, wherein receiving the indication of the field type comprises:
  receiving the indication of the field type via radio resource control signaling, medium access control (MAC) control element (MAC-CE) signaling, downlink control information signaling, uplink control information signaling, sidelink control information signaling, or any combination thereof.

10. The method of claim 1, wherein the wireless device comprises a first transmission reception point, the method further comprising:
  receiving, during a time when the UE is configured to communicate with the first transmission reception point, an indication of a field type between the UE and a second transmission reception point.

11. The method of claim 1, wherein the indication of the field type is for one of a control channel or a data channel, the method further comprising:
  receiving, from the wireless device, an indication of a second field type for the other of the control channel or the data channel.

12. The method of claim 1, wherein the indication of the field type is for the beam of a channel, the method further comprising:
  receiving, from the wireless device, an indication of a second field type for a second beam of the channel.

13. The method of claim 1, wherein the field type comprises an indication that the UE is in a near-field relative to the wireless device or that the UE is in a far-field relative to the wireless device.

14. A method for wireless communication at a base station, comprising:
  transmitting, to a user equipment (UE), an indication of a field type of a field between the UE and the base station, the indication of the field type indicating to use one of a first set of beam weight vectors or a second set of beam weight vectors; and
  communicating a reference signal with the UE based at least in part on transmitting the indication of the field type that indicates one of the first set of beam weight vectors or the second set of beam weight vectors.

15. The method of claim 14, wherein transmitting the indication of the field type comprises:
  transmitting one or more bits indicating the field type, wherein each value of the one or more bits corresponds to a respective field type of a set of field types, and wherein communicating the reference signal is based at least in part on the one or more bits.

16. The method of claim 14, wherein transmitting the indication of the field type comprises:
  transmitting a measure indicating a likelihood that the field type comprises a first field type as compared to a second field type, wherein communicating the reference signal is based at least in part on transmitting the measure indicating the likelihood.

17. The method of claim 14, wherein transmitting the indication of the field type comprises:
  transmitting an indication that the field type is the same as a second field type configured at the UE for a reference signal resource, wherein communicating the reference signal is based at least in part on transmitting the indication that the field type is the same as the second field type.

18. The method of claim 14, wherein communicating the reference signal comprises:

transmitting, to the UE, the reference signal that is a synchronization signal, a channel state information reference signal, or both.

19. The method of claim 14, wherein communicating the reference signal comprises:
receiving, from the UE, the reference signal that is a sounding reference signal.

20. The method of claim 14, wherein transmitting the indication of the field type comprises:
transmitting the indication of the field type via radio resource control signaling, medium access control (MAC) control element (MAC-CE) signaling, downlink control information signaling, uplink control information signaling, sidelink control information signaling, or any combination thereof.

21. The method of claim 14, wherein the first set of beam weight vectors is associated with a first codebook for two-dimensional beams and the second set of beam weight vectors is associated with a second codebook for three-dimensional beams, wherein transmitting the indication of the field type comprises:
transmitting the indication of the field type that indicates to select one of the first codebook or the second codebook, wherein communicating the reference signal is based at least in part on transmitting the indication of the field type that indicates to select the one of the first codebook or the second codebook.

22. The method of claim 14, wherein the indication of the field type is for one of a control channel or a data channel, the method further comprising:
transmitting, to the UE, an indication of a second field type for the other of the control channel or the data channel.

23. The method of claim 14, wherein the indication of the field type is for a beam of a channel, the method further comprising:
transmitting, to the UE, an indication of a second field type for a second beam of the channel.

24. The method of claim 14, wherein the field type comprises an indication that the UE is in a near-field relative to the base station or that the UE is in a far-field relative to the base station.

25. An apparatus for wireless communication at a user equipment (UE), comprising:
a processor;
memory coupled with the processor; and
instructions stored in the memory and executable by the processor to cause the apparatus to:
receive, from a wireless device, an indication of a field type of a field between the UE and the wireless device;
select between a first set of beam weight vectors and a second set of beam weight vectors based at least in part on the field type; and
communicate a reference signal with the wireless device using a beam generated using a first beam weight vector from the selected set of beam weight vectors.

26. The apparatus of claim 25, wherein the instructions to communicate the reference signal are executable by the processor to cause the apparatus to:
perform a beam sweep procedure using a plurality of beams corresponding to the selected set of beam weight vectors, wherein each beam of the plurality of beams is generated using a respective beam weight vector of the selected set of beam weight vectors.

27. The apparatus of claim 25, wherein the instructions to receive the indication of the field type are executable by the processor to cause the apparatus to:
receive one or more bits indicating the field type, wherein each value of the one or more bits corresponds to a respective field type of a set of field types, and wherein selecting between the first set of beam weight vectors and the second set of beam weight vectors is based at least in part on the one or more bits.

28. The apparatus of claim 25, wherein the instructions to receive the indication of the field type are executable by the processor to cause the apparatus to:
receive a measure indicating a likelihood that the field type comprises a first field type as compared to a second field type, wherein selecting between the first set of beam weight vectors and the second set of beam weight vectors is based at least in part on receiving the measure indicating the likelihood.

29. The apparatus of claim 25, wherein the instructions to receive the indication of the field type are executable by the processor to cause the apparatus to:
receive an indication that the field type is the same as a second field type configured at the UE for a reference signal resource, wherein selecting between the first set of beam weight vectors and the second set of beam weight vectors is based at least in part on receiving the indication that the field type is the same as the second field type.

30. An apparatus for wireless communication at a base station, comprising:
a processor;
memory coupled with the processor; and
instructions stored in the memory and executable by the processor to cause the apparatus to:
transmit, to a user equipment (UE), an indication of a field type of a field between the UE and the base station, the indication of the field type indicating to use one of a first set of beam weight vectors or a second set of beam weight vectors; and
communicate a reference signal with the UE based at least in part on transmitting the indication of the field type that indicates one of the first set of beam weight vectors or the second set of beam weight vectors.

* * * * *